(12) United States Patent
He et al.

(10) Patent No.: US 10,794,029 B2
(45) Date of Patent: Oct. 6, 2020

(54) HYDROGEL BIOCEMENT SYSTEMS AND METHODS

(71) Applicant: ARIZONA BOARD OF REGENTS ON BEHALF OF ARIZONA STATE UNIVERSITY, Scottsdale, AZ (US)

(72) Inventors: Ximin He, Tempe, AZ (US); Edward Kavazanjian, Tempe, AZ (US); Nasser Hamdan, Scottsdale, AZ (US); Zhi Zhao, Mesa, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 71 days.

(21) Appl. No.: 16/077,435

(22) PCT Filed: Feb. 13, 2017

(86) PCT No.: PCT/US2017/017649
§ 371 (c)(1),
(2) Date: Aug. 10, 2018

(87) PCT Pub. No.: WO2017/139750
PCT Pub. Date: Aug. 17, 2017

(65) Prior Publication Data
US 2019/0256770 A1 Aug. 22, 2019

Related U.S. Application Data

(60) Provisional application No. 62/294,812, filed on Feb. 12, 2016.

(51) Int. Cl.
*E02D 3/12* (2006.01)
*C09K 17/50* (2006.01)
(Continued)

(52) U.S. Cl.
CPC .............. *E02D 3/12* (2013.01); *C09K 17/50* (2013.01); *C04B 14/285* (2013.01); *C04B 24/14* (2013.01);
(Continued)

(58) Field of Classification Search
CPC ....................................................... E02D 3/12
See application file for complete search history.

(56) References Cited

U.S. PATENT DOCUMENTS 5,670,567 A   9/1997  Lahalih
5,824,725 A  10/1998  Lahalih
(Continued)

FOREIGN PATENT DOCUMENTS

WO    2006066326 A1   6/2006
WO    2013/120847 A1  8/2013
(Continued)

OTHER PUBLICATIONS

Korean Intellectual Property Office; PCT International Search Report, issued in connection to PCT/US2017/017649; 3 pages; dated May 22, 2017; Korea.
(Continued)

*Primary Examiner* — Janine M Kreck
(74) *Attorney, Agent, or Firm* — Snell & Wilmer L.L.P.

(57) ABSTRACT

A soil stabilization method of forming an admixture of at least one hydrogel precursor and urease enzyme, and contacting at least a portion of the admixture with soil, and forming a hydrogel network in-situ within at least a portion of the soil, wherein at least a portion of the hydrogel network includes in-situ precipitated calcium carbonate. In some embodiments, at least a portion of the hydrogel network is formed in-situ by polymerizing the at least one hydrogel precursor in the presence of the urease enzyme.

20 Claims, 14 Drawing Sheets

(51) Int. Cl.

| | |
|---|---|
| C04B 14/28 | (2006.01) |
| C04B 24/14 | (2006.01) |
| C04B 26/22 | (2006.01) |
| C04B 26/28 | (2006.01) |
| C04B 103/00 | (2006.01) |
| C04B 111/00 | (2006.01) |
| E21D 9/00 | (2006.01) |
| C09K 3/22 | (2006.01) |
| C08L 5/00 | (2006.01) |
| E21D 9/06 | (2006.01) |
| C08L 1/26 | (2006.01) |

(52) U.S. Cl.
CPC ............ *C04B 26/22* (2013.01); *C04B 26/285* (2013.01); *C04B 2103/0001* (2013.01); *C04B 2111/00146* (2013.01); *C04B 2111/00732* (2013.01); *C08L 1/26* (2013.01); *C08L 5/00* (2013.01); *C09K 3/22* (2013.01); *E21D 9/002* (2013.01); *E21D 9/0678* (2016.01)

(56) References Cited

U.S. PATENT DOCUMENTS

| | | | |
|---|---|---|---|
| 8,420,362 | B2 | 4/2013 | Crawford et al. |
| 9,850,379 | B2* | 12/2017 | Li .......................... C08L 33/02 |
| 10,392,767 | B2 | 8/2019 | Kavazanjian et al. |
| 10,399,130 | B2 | 9/2019 | Halden et al. |
| 10,563,233 | B2 | 2/2020 | Kavazanjian et al. |
| 2015/0299975 | A1* | 10/2015 | Li .......................... C09K 17/48 |
| | | | 405/302.6 |
| 2016/0244931 | A1 | 8/2016 | Kavazanjian et al. |
| 2019/0382976 | A1 | 12/2019 | Kavazanjian et al. |

FOREIGN PATENT DOCUMENTS

| | | | |
|---|---|---|---|
| WO | 2015065951 | A1 | 5/2015 |
| WO | 2015065963 | A1 | 5/2015 |
| WO | 2017015230 | A1 | 1/2017 |

OTHER PUBLICATIONS

Korean Intellectual Property Office; PCT Written Opinion of the International Searching Authority, issued in connection to PCT/US2017/017649; 4 pages; dated May 22, 2017; Korea.

Angers et al., "Plant-induced changes in soil structure: processes and feedbacks." Biogeochemistry 42.1-2, 1998, pp. 55-72.

Anseth et al. "In situ forming degradable networks and their application in tissue engineering and drug delivery." J. Control. Release, 78(1), 2002, pp. 199-209.

Bang et al., "Application of novel biological technique in dust suppression." Proc. Transportation Research Board 88th Annual Meeting (No. 09-0831) 2009.

Bercea et al., "Dextran-Based Polycations: Thermodynamic Interaction with Water as Compared With Unsubstituted Dextran, 2—Flory/Huggins Interaction Parameter." Macromolecular Chemistry and Physics 212.17, 2011, pp. 1932-1940.

Stern et al., "Economic growth and environmental degradation: the environmental Kuznets curve and sustainable development." World Development 1996, 24, pp. 1151-1160.

Blakeley et al., "Jack bean urease: the first nickel enzyme." Journal of molecular catalysis 23.2-3, 1984, pp. 263-292.

Borja, "Condition for liquefaction instability in fluid-saturated granular soils", Acta Geotechnica 2006, 1, pp. 211-224.

Braissant, et al. "Bacterially induced mineralization of calcium carbonate in terrestrial environments: the role of axopolysaccharides and amino acids." J. of Sedimentary Research, 73(3), 2003, pp. 485-490.

Chen et al., "Removal of heavy metal ions by a chelating resin containing glycine as chelating groups", Separation and purification technology 2007, 54, pp. 396-403.

Chen et al., "Biopolymer stabilization of mine tailings." J. Geotech. and Geoenviron. Eng., 139(10), 2013, pp. 1802-1807.

Cheng et al., "Post-failure behavior of tunnel heading collapse by Mpm simulation", Science China Technological Sciences 2015, 58, pp. 2139-2152.

Chou et al., "Biocalcification of sand through ureolysis." Journal of Geotechnical and Geoenvironmental Engineering, 137(12), 2011, pp. 1179-1189.

Chudzikowski "Guar gum and its applications." J Soc. Cosmet. Chem., 22, 1971, pp. 43-60.

Watson et al., Air pollution engineering manual 2nd Edition, Wiley-Interscience, Hoboken, 2000, pp. 117-135.

Decho "Overview of biopolymer-induced mineralization: what goes on in biofilms?" Ecological Engineering 36.2, 2010, pp. 137-144.

DeJong et al., "Biogeochemical processes and geotechnical applications: progress, opportunities and challenges." Geotechnique, 63(4), 2013, pp. 287-301.

DeJong, Jason T. et al. "Microbial ly induced cementation to control sand response to undrained shear. " Journal of Geotechnical and Geoenvironmental Engineering, 2006, vol. 132, pp. 1381-1392.

DeJong, Jason T. et al. "Bio-mediated soi l improvement. " Ecological Engineering, 2010, vol. 36, pp. 197-210.

Demitri et al., "Potential of cellulose-based superabsorbent hydrogels as water reservoir in agriculture", International Journal of Polymer Science 2013, 2013.

Doussan et al., "Water uptake by plant roots: II—modelling of water transfer in the soil root-system with explicit account of flow within the root system—comparison with experiments", Plant and soil 283.1-2, 2006, pp. 99-117.

Eliassi et al., "Measurement of activity of water in aqueous poly(ethylene glycol) solutions (effect of excess volume on the Flory-Huggins x-parameter)." J. Chem. Eng. Data, 44(1), 1999, pp. 52-55.

Emerson et al., "Determination of solvent—polymer and polymer—polymer Flory—Huggins interaction parameters for poly(3-hexylthiophene) via solvent vapor swelling." Macromolecules, 46(16), 2013, pp. 6533-6540.

Ercole et al., "Bacterially induced mineralization of calcium carbonate: the role of exopolysaccharides and capsular polysaccharides." Microscopy and Microanalysis, 13(01), 2007, pp. 42-50.

Estroff et al., "An organic hydrogel as a matrix for the growth of calcite crystals." Org. Biomol. Chem., 2(1), 2004, pp. 137-141.

Faschingleitner et al., "Evaluation of primary and secondary fugitive dust suppression methods using enclosed water spraying systems at bulk solids handling," Advanced Powder Technology, 22, 2011, pp. 236-244.

Fernando et al., "Forecasting PM10 in metropolitan areas: Efficacy of neural networks." Environmental pollution 163, 2012, pp. 62-67.

Fu et al., "Thermochemistry and kinetics of chemical polymerization of aniline determined by solution calorimetry." Chemistry of materials 6.5, 1994, pp. 671-677.

Galán-Marin et al., "Clay-based composite stabilized with natural polymer and fibre."Construction and Building Materials 2010, vol. 24, pp. 1462-1468.

Garrigues et al., "Water uptake by plant roots: I—Formation and propagation of a water extraction front in mature root systems as evidenced by 2D light transmission imaging." Plant and Soil 2006, 283, pp. 83-98.

Sciarra et al., "Soil-gas survey of liquefaction and collapsed caves during the Emilia seismic sequence." Annals of Geophysics 2012, 55.

Hoffmann, "Conventional and Environmentally-sensitive Hydrogels for Medical and Industrial Uses: A Review Paper" Polymer Gels, 1991, pp. 289-297.

Jones et al., "Effects of temperature, pH, salinity, and inorganic nitrogen on the rate of ammonium oxidation by nitrifiers isolated from wetland environments." Microbial Ecology 1980, 6, pp. 339-347.

Karraker et al., "Impacts of road deicing salt on the demography of vernal pool-breeding amphibians." Ecological Applications 2008, 18, pp. 724-734.

Kavazanjian E. and Hamdan N. (2014). "Enzyme induced carbonate precipitation (EICP) columns for ground Improvement." Proc. of the 2015 ASCE Geo-Institute GeoCongress, San Antonio, Texas.

(56) References Cited

OTHER PUBLICATIONS

Kherb et al., "Role of carboxylate side chains in the cation Hofmeister series." The Journal of Physical Chemistry B 2012, 116, pp. 7389-7397.
Kim et al., "Hydrogel-actuated integrated responsive systems (HAIRS): Moving towards adaptive materials." Current Opinion in Solid State and Materials Science 2011, 15, pp. 236-245.
Lambers, "Introduction, dryland salinity: a key environmental issue in southern Australia." Plant and Soil 2003, 257, v-vii.
Maghchiche et al., "Use of polymers and biopolymers for water retaining and soil stabilization in arid and semiarid regions." Journal of Taibah University for Science 2010, 4, pp. 9-16.
McKenna Neuman et al., "Wind tunnel simulation of environmental controls on fugitive dust emissions from mine ailings." Atmospheric Environment 2009, 43, pp. 520-529.
Mehta, "Reducing the environmental impact of concrete."Concrete international 2001, 23, pp. 61-66.
Meyer et al., "Microbiologically-Induced Soil Stabilization: Application of Sporosarcina pasteurii for Fugitive Dust Control." Proc. Of the 2011 ASCE Geo-Frontiers, Advances in Geotechnical Engineering, 2011, pp. 4002-4011.
Monlux et al., U.S. Department of Agriculture, Forest Service, National Technology and Development Program 36771805-SDTDC, 2006, 1-23.
Nemati et al. "Modification of porous media permeability, using calcium carbonate produced enzymatically in situ." Enzyme and Microbial Technology 2003, 33, pp. 635-642.
Neupane et al., "Soil Improvement through enzymatic calcite precipitation technique: small to large scale experiments." Int. J. Lsld. Env. 2013, 1, pp. 65-66.
Neupane et al., "Applicability of enzymatic calcium carbonate precipitation as a soil-strengthening technique." Journal of Geotechnical and Geoenvironmental Engineering, 2013, vol. 139, pp. 2201-2211.
Oades et al., Australian Journal of Soil Research 1991, 29, 815-828.
Orts et al., J. Mater. Civ. Eng. 2007, 19, pp. 58-66.
Prusinski et al., "Effectiveness of Portland cement and lime in stabilizing clay soils." Transportation Research Record: Journal of the Transportation Research Board 1999, 1652, pp. 215-227.
U.S. Appl. No. 13/944,450, filed Jul. 17, 2013, Kavazanjian et al.
U.S. Appl. No. 16/782,361, filed Feb. 5, 2020, Kavazanjian et al.
Talukdar et al., "Swelling and drug release behaviour of xanthan gum matrix tablets." Inter. J. of Pharmaceutics, 1995, 120(1), pp. 63-72.
Tanaka et al., "Use of fall cone test as measurement of shear strength for soft clay materials." Soils and Foundations 2012, 52, pp. 590-599.
United States Environmental Protection Agency, Green Book, http://www3.epa.gov/airquality/greenbook/mapnpoll.html.
Van Humbeck et al., "Ammonia capture in porous organic polymers densely functionalized with bronsted acid groups." Journal of the American Chemical Society 2014, 136, pp. 2432-2440.
Van Oss et al., "Cement manufacture and the environment part II: environmental challenges and opportunities." Journal of Industrial Ecology 2003, 7, pp. 93-126.
Van Oss et al., "Cement manufacture and the environment: part I: chemistry and technology." Journal of Industrial Ecology 2002, 6, pp. 89-105.
Woolard et al., "Treatment of hypersaline wastewater in the sequencing batch reactor." Water Research 1995, 29, pp. 1159-1168.
Wu et al., "Effect of cross-linking on the diffusion of water, ions, and small molecules in hydrogels." The Journal of Physical Chemistry B 2009, 113, pp. 3512-3520.
Yasuhara et al., "Experiments and predictions of physical properties of sand cemented by enzymatically-induced aarbonate precipitation." Soils and Foundations 2012, 52, pp. 539-549.
Zheng et al., "Evaluation of ammonium removal using a chitosan-g-poly (acrylic acid)/rectorite hydrogel composite." Journal of hazardous materials 2009, 171, pp. 671-677.
Zobeck,"Soil properties affecting wind erosion."Journal of Soil and Water Conservation 1991, 46, pp. 112-118.
Burbank, M., Weaver, T. Lewis, R., Williams, T., Williams, B. & Crawford, R. (2012). Geotechnical tests of sands rollowing bioinduced calcite precipitation catalyzed by indigenous bacteria. J. Geotech. Geoenviron. Engng 139, No. 6, 328-936.
DeJong, J.T., Martinez, B.C., Hunt, C.E., deVlaming, L.A., Major, D.W. & Dworatzek, S. M. (2013). Bio-mediated soil mprovement field study to stabilize mine sands. Proceedings of GeoMontreal 2013, Montreal, Canada.
Greely, R., Leach, R., White, B., Iversen, J. & Pollack, J. (1980). Threshold windspeeds for sand on mars: wind tunnel simulations. Geophys. Res. Lett. 7, No. 2, 121-124.
Greeley, R. White, B.R., Pollack, J.B., Iversen, J.D. & Leach, R.N. (1981). Dust storms on mars: considerations and simulations. Geol. Soc. Am. Special Papers 186, 101-122.
Van Paassen. L.A., Daza, C.M., Staal, M., Sorokin, D.Y., van der Zonb, W., van Loosdrecht, M.C. (2010). "Potential Soil Reinforcement by Biological Dentrification." Ecological Engineering, vol. 36(2): 168-175.
Harkes, M.P., van Paassen, L.A., Booster, J.L., Whiffin, V.S. & Van Loosdrecht, M. (2010). Fixation and distribution of bacterial activity in sand to induce carbonate precipitation for ground reinforcement. Ecol. Engn 36, No. 2, 112-117.
Ivanov, V. & Chu, J. (2008). Applications of microorganisms to geotechnical engineering for bioclogging and biocementation of soil in situ. Rev. Environ. Sci. Biotechnol. &, No. 2, 139-153.
Kavazanjian, E. Jr and Karatas, I. (2008). Microbiological improvement of the physical properties of soil. Proceedings of 6th international conference on case histories in geotechnical engineering, Rolla, MO, USA, pp. 58-66.
Kucharski, Es., Winchester, W. A., Whiffin, V.S., Al-Thawadi, S. & Mutlaq, J. (2005). Microbial biocementation. U.S. Pat. No. 8,182,604B2 A1, Oct. 9, 2008.
Van Paassen, L.A., Ghose, R., van der Linden, T.J. M., van der Star, W.R.L. & van Loosdrecht, M.C. M. (2010). Duantifying biomediated ground improvement by ureolysis: large-scale biogrout experiment. J. Geotech. Geoenviron. Engng 136, No. 12, 1721-1728.
Williams, D.A. & Greely, R. (2013). NASA's planetary aeolian laboratory: exploring aeolian precesses on earth, mars, and titan. Proceedings of the 44th lunar and planetary science conference, Houston, TX, USA.
Das, N., Kayastha, A.M., & Srivastava, P.K. (2002) "Purification and Characterization of Urease from Dehusked Pigeonpea Seeds," Phytochemistry, 61(5), 513-521.
He, J., Chu, J., & Ivanov, V.(2013) "Mitigation of Liquefaction of Saturated Sand using Biogas," Geotechnique, 63(4), 367-275.
Martinez, B.C., DeJong, J.T., Ginn, T.R., Montoya, B.M., Barkouki, T.H., Hunt C., Tanyu, B., Major, D. (2013) "Experimental Optimization of Microbial-induced Carbonate Precipitation for Soil Improvement," Journal of Geotechnical and Geoenvironmental Engineering, vol. 139: 587-598.

* cited by examiner

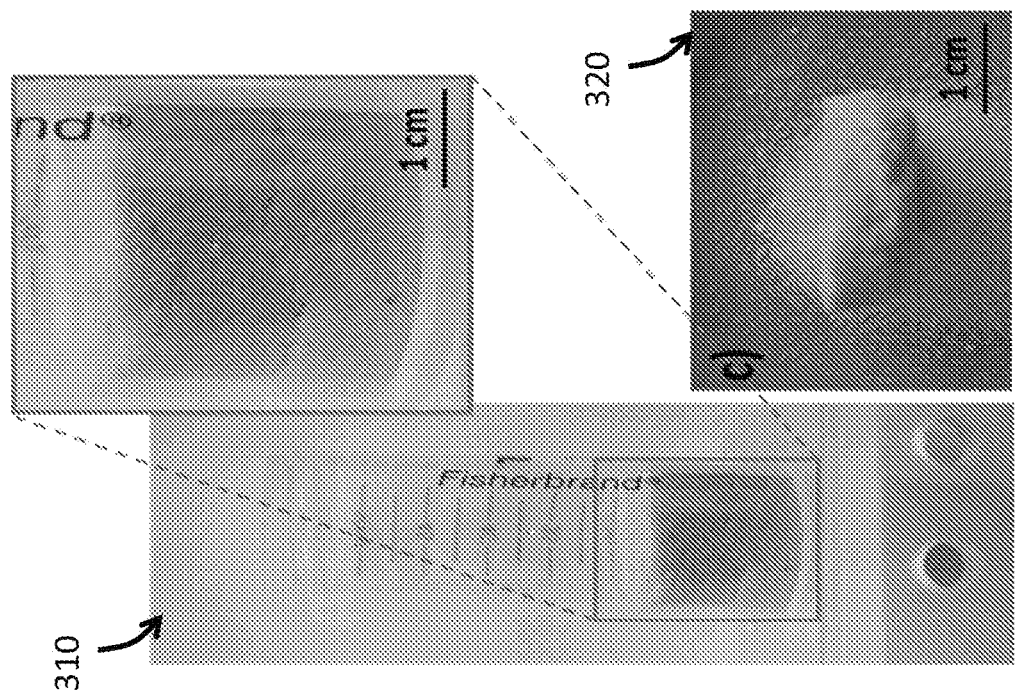
FIG. 3C
FIG. 3B
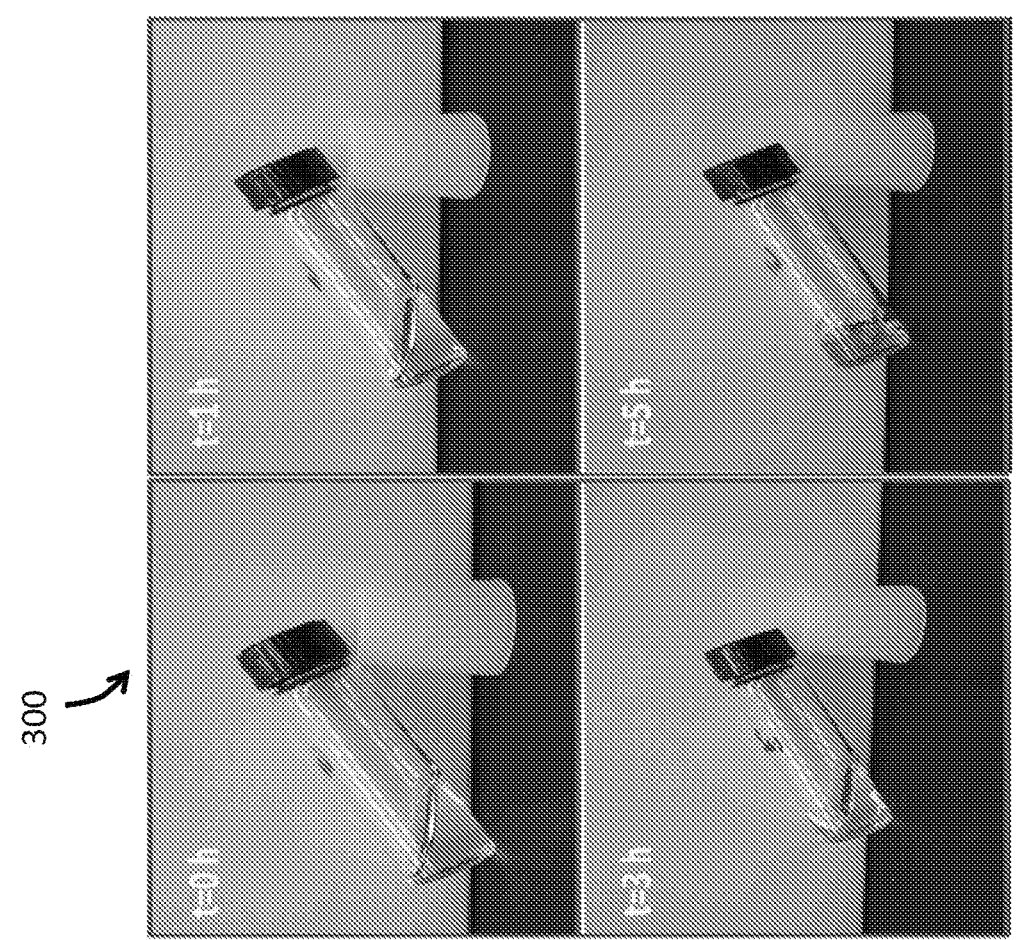
FIG. 3A

HYDROGEL BIOCEMENT SYSTEMS AND METHODS

RELATED APPLICATIONS

This application claims the benefit, and priority benefit, of International Patent Application No. PCT/US2017/017649, filed on Feb. 13, 2017, which designated the United States and was entitled "HYDROGEL BIOCEMENT SYSTEMS AND METHOD," which claims the benefit and priority benefit of U.S. Provisional Patent Application Ser. No. 62/294,812, filed on Feb. 12, 2016, the disclosure and contents of which are incorporated by reference herein in their entirety.

STATEMENT REGARDING FEDERAL SPONSORED RESEARCH OR DEVELOPMENT

Some research conducted for conception and development of at least one embodiment of the invention described herein was made using Federal funding awarded by the National Science Foundation under Grant No. CMS-1208026. The U.S. Federal Government has certain rights in the invention.

BACKGROUND

Enzyme induced carbonate precipitation (EICP) has been proposed as a method for stabilization of soil to address concerns regarding erosion and finding suitable ground for civil infrastructure construction, global issues of increasing importance. Stabilization of soils using this technique is of interest due to the susceptibility of soils to wind- and water-induced erosion and the potential for earthquake-induced liquefaction (when soil is saturated). Soils of relatively high compressibility and their relatively low shear strength may also be amenable to improvement using this technique. Traditional methods of soil improvement usually involve heavy machinery and either the use of energy intensive materials such as Portland cement, or other chemical admixtures that can have large negative impacts on the environment, including $CO_2$ emissions, excessive consumption of natural resources, and generation of hazardous waste. Environmentally sustainable soil stabilization solutions are needed to reduce the environmental impacts of and supplement or replace current ground improvement practices.

One example of the need for sustainable ground improvement solutions is the mitigation of fugitive dust emissions, a significant concern in many arid to semi-arid regions of the world, including the southwestern United States. Fugitive dust emission, the release of soil particles into the air, has significant negative impacts on human health and safety. Some areas of the southwestern United States are considered air quality non-attainment zones (areas where the air quality is unacceptable) by the federal Environmental Protection Agency due primarily to fugitive dust emissions. Areas with disturbed soil due to construction activities and finer grained waste material such as mine tailings are also susceptible to fugitive dust emissions. A common method for fugitive dust suppression is the constant application of water, which is an unsustainable practice, particularly in arid and semi-arid environments. Other common approaches to dust suppression include the topical application of synthetic polymers or salts.

Loose cohesionless soils also present significant challenges for construction and the resilience of a variety of civil infrastructure systems. Literally trillions of dollars of civil infrastructure world-wide are at risk due to earthquake-induced soil liquefaction, a phenomenon in which saturated cohesionless soil loses its strength and stiffness when subject to earthquake induced strong ground motions. In 2011, a moderate (magnitude 6.3) earthquake in Christchurch, New Zealand resulted in over 10 billion dollars in direct damage to civil infrastructure due to liquefaction, and many billions more in indirect economic losses. At the present time, there is no cost-effective way to mitigate the potential for liquefaction beneath and around existing civil infrastructure. Other infrastructure related problems associated with loose cohesionless soils include limited bearing capacity of shallow foundations, and the difficulty in maintaining stable tunnel openings following excavation and prior to construction of the permanent tunnel support system.

EICP offers the potential for mitigation of the soil erosion and infrastructure construction problems described above, as well as a variety of other geotechnical problems. EICP employs the urease-catalyzed hydrolysis of urea to generate carbonate mineral under the presence of calcium ion. The overall ureolytic reaction is:

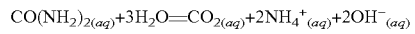

Under the appropriate geochemical conditions and in the presence a suitable divalent cation such as calcium, carbonate mineral precipitation can occur:

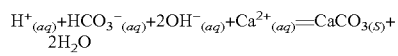

The net urease catalyzed precipitation reaction for $CaCO_3$ can be written as:

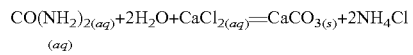

EICP has attracted increasing attention for a variety of sustainability-related applications, including not only fugitive dust control and mitigating earthquake-induced soil liquefaction, but also for low volume (unpaved) road surface improvement, as an alternative to Portland cement for fabricating structural building materials from granular soil, and for sealing porous geologic formations to facilitate oil and gas recovery.

Although EICP has demonstrated great potential as a sustainable alternative to traditional soil stabilization practices, there are a number of challenges associated with the application of EICP in its current form. For instance, one of the challenges pertaining to the topical application of EICP for surficial stabilization of soils is that EICP occurs in a water-based solution that may dry out so quickly when applied to dry soil that sufficient EICP may not have time to occur. This tendency to dry out too quickly is exacerbated in silty-sand soils and mine tailings, and soils particularly susceptible to fugitive dust emission due to their tendency to exhibit hygroscopic behavior that accelerates the desiccation of the EICP solution at the soil surface. Even if the EICP solution does not evaporate too quickly, it may penetrate too rapidly into deeper soil layers, which leads to less carbonate precipitation at the desired location (in this case, the soil surface). Another problem associated with EICP is the production of ammonium ($NH_4^+$), an undesirable byproduct of the hydrolysis of urea in the EICP process, which can reduce calcite yield and potentially lead to the formation of other environmental pollutants through the oxidation of $NH_4^+$. Addressing these challenges would significantly enhance the soil stabilization potential of EICP, and expand its applicability as an effective, sustainable ground improvement technique.

In nature, plants have developed the strategy of forming an extensive network of roots to anchor themselves tightly in the soil. Root systems feature high water affinity and have great ion absorbing ability in order to constantly provide the stems and leaves of the associated flora with water and dissolved minerals. If integrated into EICP processes, these features offer the potential for considerable improvement in soil stabilization. Further, these properties may be used to retain water and other reagents of EICP as well as to localize the EICP reaction. Mimicking the hyper-branched root structure of plants, which is known to facilitate aggregation of soil particles, can provide additional enhancement to EICP-treated soil in terms of higher strength and a larger length scale of continuity. As it is impractical to directly apply root systems to EICP, some chemical substitutions need to be pursued to realize these benefits.

Hydrogels are crosslinked hydrophilic polymers that possess extraordinary water retention capabilities. A three-dimensional network of hydrogel should be able to enhance soil aggregations and improve soil strength. In addition, hydrogels can facilitate the removal of the ammonium generated by EICP. The functional groups within synthetic hydrogels can be engineered to provide additional functions, such as pH control and selective ion binding, which can play a critical role in $NH_4^+$ mitigation in EICP. Surprisingly, current hydrogel based soil stabilization has focused only on water retention, and has ignored what has been discovered to be promising soil strengthening and contaminant mitigation capability of hydrogels.

SUMMARY

Some embodiments include a soil stabilization method comprising forming an admixture of at least one hydrogel precursor and urease enzyme, contacting at least a portion of the admixture with soil, and forming a hydrogel network in-situ within at least a portion of the soil, where at least a portion of the hydrogel network includes in-situ precipitated calcium carbonate.

In some embodiments, the at least one hydrogel precursor comprises at least one hydrogel monomer or pre-polymer. In some further embodiments, the at least one hydrogel precursor comprises a hydrogel polymer. In some embodiments, the contacting occurs by injecting or pumping the admixture into the soil. In other embodiments, the contacting occurs by soaking the admixture into the soil. In some further embodiments, the contacting occurs by mixing the soil and the admixture. In some embodiments, the soil includes at least one of a soil surface and a bulk soil.

In some embodiments of the invention, the urease enzyme is added to the admixture prior to contacting the admixture with the soil. In some further embodiments, at least a portion of the urease enzyme is present in the soil. In some further embodiments, at least a portion of the calcium carbonate precipitate is derived from at least one calcium salt added to the admixture prior to contacting the admixture with the soil. In other embodiments, at least a portion of the calcium carbonate precipitate is derived from at least one divalent metal salt present in the soil.

In some embodiments of the invention, at least a portion of the carbonate precipitate is dispersed through at least a portion of the hydrogel network. In some further embodiments, at least a portion of the hydrogel network is formed in-situ by polymerizing the at least one hydrogel precursor in the presence of the urease enzyme.

Some embodiments include at least one hydrogel precursor that is acrylic acid. In some further embodiments, the hydrogel precursor is selected from polyvinylpyrrolidone, polyvinyl alcohol, polyurethane, sodium polyacrylate and acrylate polymers and copolymers, dextran, and hyaluronan. In other embodiments, the hydrogel precursor is selected from xanthan gum, guar gum, acacia tragacanth, chitosan, pectin, align, agar-agar, carrageenan, *cassia* gum, carboxymethyl cellulose, gellan gum, hydroxypropyl cellulose, Konjac gum, locust bean gum, plant-derived methylcellulose and hydroxypropyl methylcellulose, and microcrystalline cellulose.

In some embodiments, the hydrogel network comprises a polyacrylic acid gel. In other embodiments, the calcium salt is calcium chloride. In some embodiments, the admixture includes urea. In some further embodiments, the hydrogel network forms a root-like structure within the soil.

DESCRIPTION OF THE DRAWINGS

FIG. 3A shows time lapse images of the spontaneous curing of a PAA precursor in accordance with some embodiments of the invention.

FIG. 3B shows a representative image of the precipitate formed on a soil surface, and an inset with a magnified image of the soil surface, where the color difference and minor cracks indicate the boundary between the precipitate region and sand, in accordance with some embodiments of the invention.

FIG. 3C shows a side view of a soil crust formed by EICP after removing unbound sand particles in accordance with some embodiments of the invention.

cut into paper cups longitudinally to provide a view of the soil profile in accordance with some embodiments of the invention.

FIGS. 7A-7D illustrate SEM images of the soil crust obtained from Cup #4 using xanthan gum assisted EICP at high $CaCl_2$ concentration in accordance with some embodiments of the invention.

Figures 8A, 8B, 8C:
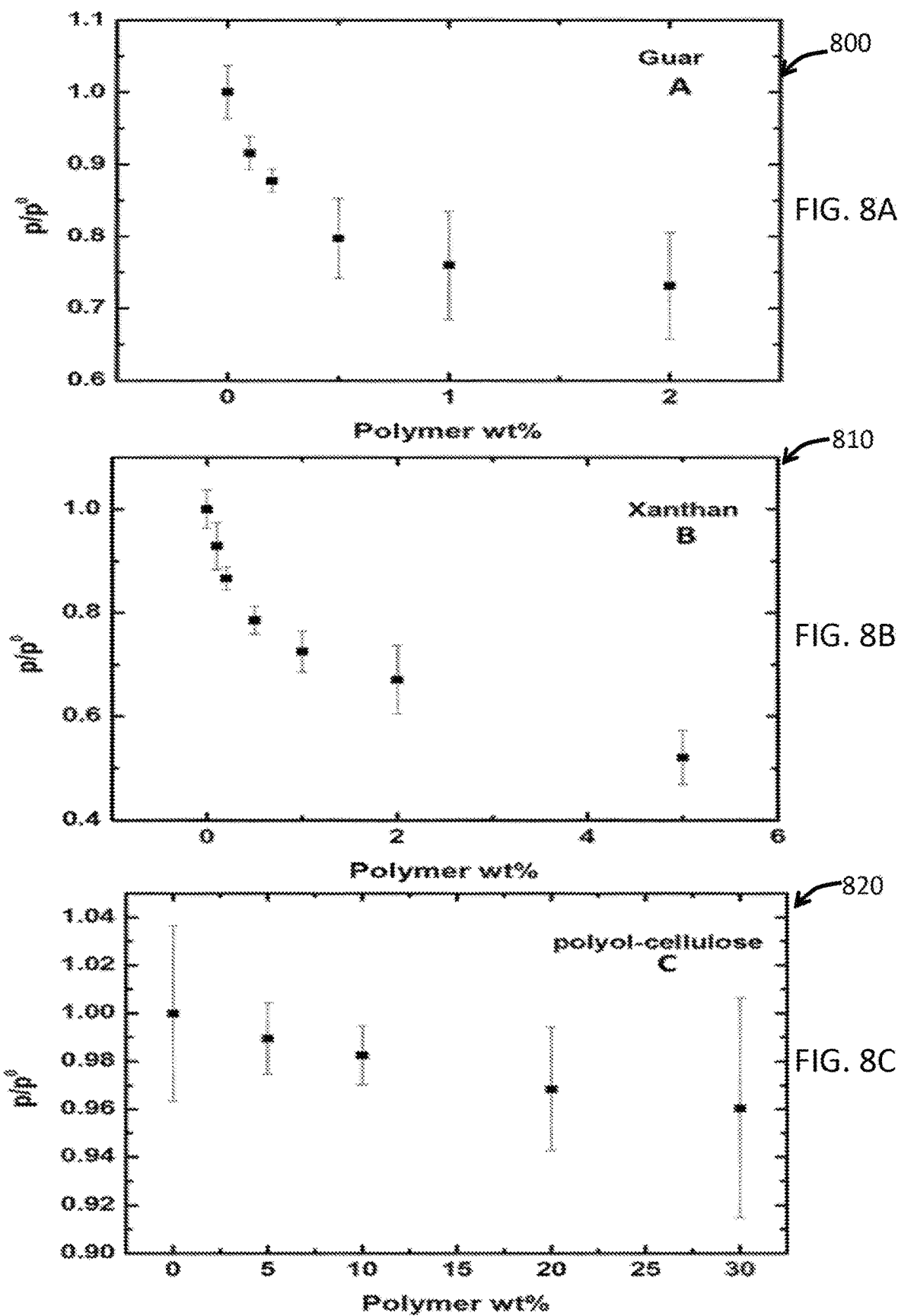

FIGS. 8A-8C illustrates plots of normalized vapor pressure changes of different polymer solutions at various concentrations.

Figure 9A:
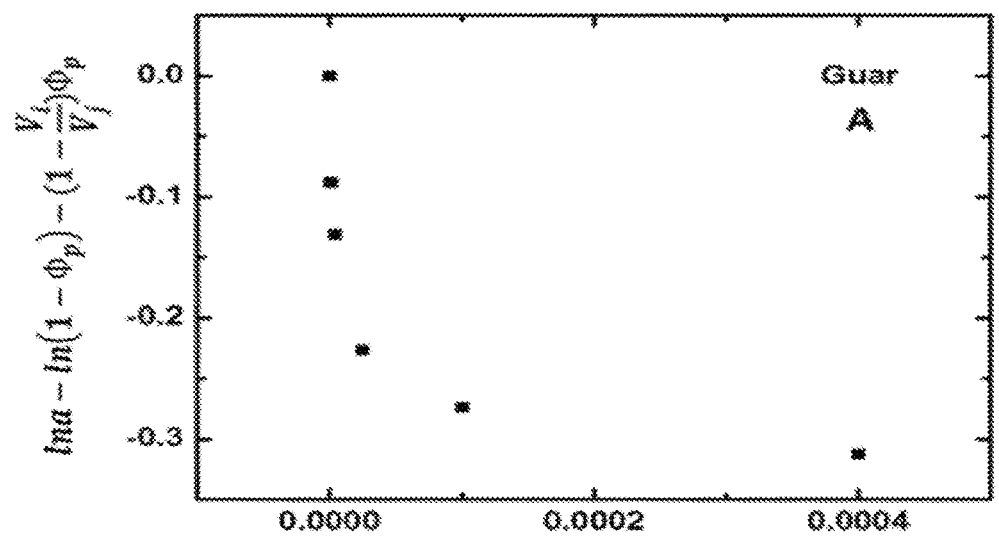
Figure 9B:
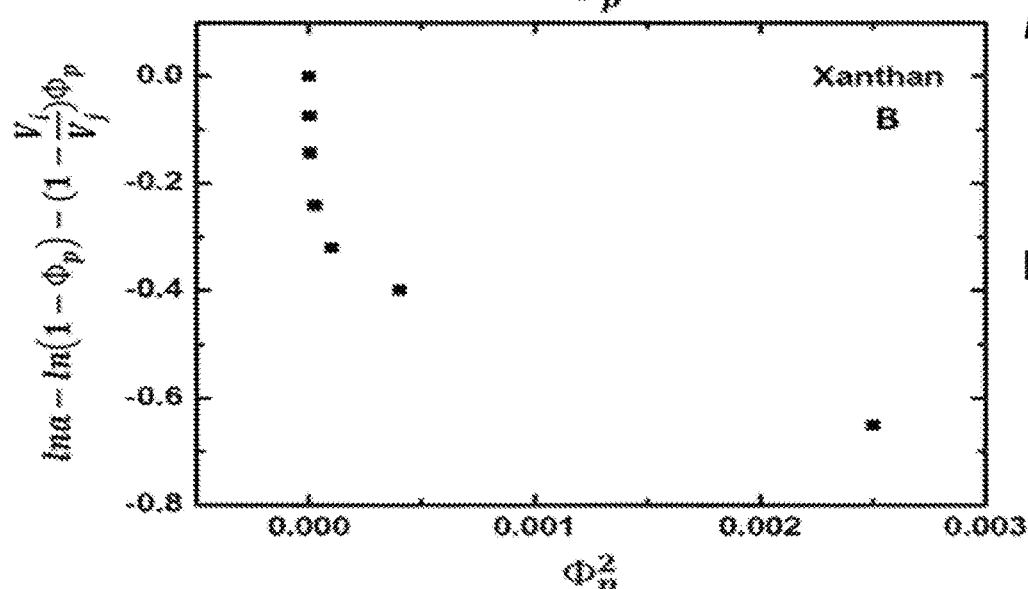
Figure 9C:
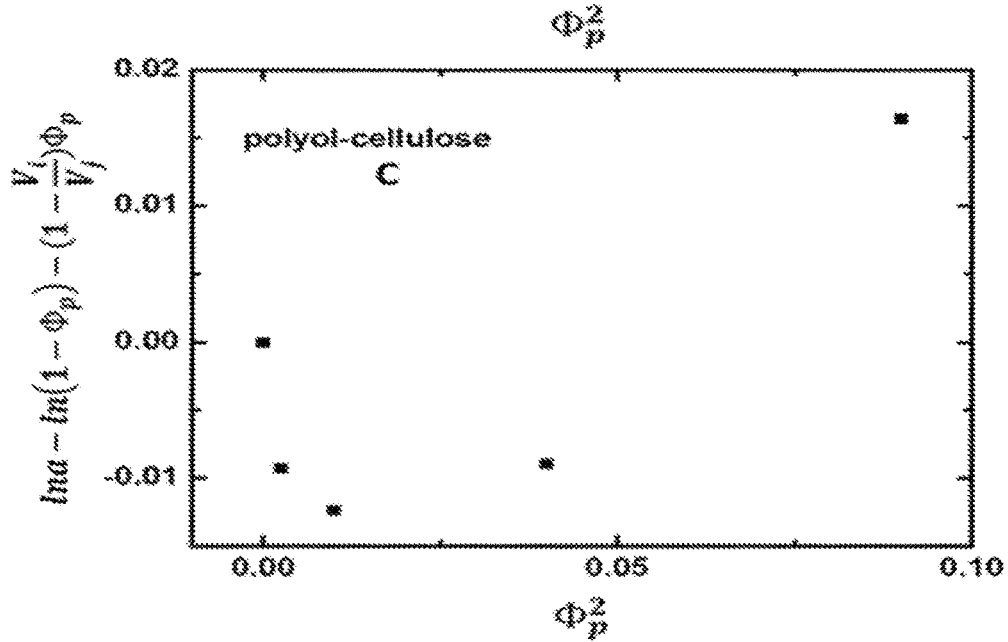

FIGS. 9A-9C shows plots of the differences between the natural log of solvent partial pressure and the entropic contribution versus $\Phi p2$. for guar gum, xanthan gum, and polyol-cellulose in accordance with some embodiments of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Some embodiments of the invention include hydrogel compositions that enhance enzyme induced carbonate precipitation (EICP). In some embodiments, the hydrogel compositions can facilitate the hydrolysis of urea (through ureolysis) to promote the geochemical conditions conducive to carbonate mineral precipitation. In some embodiments, the hydrogel compositions disclosed herein can be used for stabilization of surficial soils susceptible to wind-induced erosion (e.g., the suppression of fugitive dust) and improvement of low volume road surfaces by formation of a durable and long-lasting calcium carbonate ($CaCO_3$) mineral crust. Other uses include improving the bearing capacity of soils, facilitating excavation and tunneling, and mitigating the potential for earthquake-induced soil liquefaction.

Some embodiments of the invention include methods to synthesize a hyper-branched bio-mimetic hydrogel network across a soil matrix. In some embodiments, the method can be used to mimic the hierarchical structure, as well as the water retention, ion absorption, and soil aggregation capabilities of root systems of plants in a chemically controllable manner. In some embodiments, the hydrogel compositions disclosed herein can form networks that bind loose soil grains into aggregates and work synergistically with enzyme-induced carbonate precipitation (EICP). In some further embodiments, the hydrogel compositions can provide multiple benefits including lengthening of water supply time, localization of cementation reactions, reduction of harmful byproducts, and achievement of ultra-high soil strength. In some other embodiments, the use of hydrogel compositions disclosed herein can aid in the formation of soil crusts that can sustain up to 41 atm of pressure as measured by a cutting test, a level comparable to cementitious materials, indicating the significant potential for effective erosion control and other soil stabilization applications.

In some embodiments of the invention, synthetic hydrogels can be used either as synthetic hydrogel mixtures with other synthetic hydrogels, or with one or more other naturally occurring hydrogels. For example, some hydrogels can include polyvinylpyrrolidone and polyvinyl alcohol-based polymers and copolymers, polyurethane-based hydrogel, sodium polyacrylate and acrylate polymers and copolymers, polysaccharides and polysaccharide derivatives, such as dextran, and hyaluronan. Further, some embodiments include hydrophilic materials comprising a heteropolysaccharide and a polysaccharide capable of cross-linking the heteropolysaccharide in the presence of aqueous solutions.

Some embodiments of the invention include hydrogels that are formed in-situ. For example, some embodiments include an injectable hydrogel precursor solution that is cured in-situ into a hydrogel in soil to form root-like structures for soil stabilization. In some embodiments, the precursors can be monomers or pre-polymers. For example, some embodiments can include in-situ formation of polyacrylic acid (PAA) hydrogel using acrylic acid. In some embodiments, once applied or injected into soil and polymerized, the resulting in-situ formed hydrogel can mimic a root system to increase water retention, localize the precipitation reaction, and attenuate ammonium in the EICP process described earlier. For example, in some embodiments, a mixture of a conventional EICP solution and a thermally curable PAA precursor can be used for surficial soil treatment.

Some embodiments of the invention include cross-linked polyacrylic acid gel ("x-PAA") which can be prepared by dissolving about 400 mg acrylic acid ("AA"), about 20 mg N,N'-methylenebisacrylamide ("Bis"), and about 10 mg Ciba® IRGACURE® 2959 in 1 mL deionized ("DI") water. Ciba® IRGACURE® 2959 is available from BASF. In some embodiments, the mixture can be cured under UV light (e.g., such as a Dymax 5000-EC UV light curing flood system) for about 30 seconds. In some embodiments, a thermally curable PAA precursor such as acrylic acid (t-AA) can be prepared that can be directly injected into soil prior to curing. For example, in some embodiments, a stock solution can be made by mixing about 0.225 g of ammonium persulfate (APS, 98%), with about 349.4 grams of DI water. Further, about 4.03 grams of AA can be added into about 9.99 grams of stock solution and about 1.992 grams of NaOH can be slowly added into this solution under continuous stirring in ice bath. After substantially all the NaOH is dissolved, the solution can be taken out of the ice bath and stored under at room temperature (e.g., between about 65° F. to 75° F.). In some embodiments, the solution can be applied to a soil surface and cured in about 5 hours at 40° C.

In some embodiments, the materials used to prepare hydrogel compositions and to test the compositions can be hydrochloric acid (ACS Grade), sodium hydroxide (≥98%), phosphoric acid (ACS Grade), acrylic acid (AA, 99%), N,N'-methylenebisacrylamide (Bis, 99%), 2-hydroxy-4'-(2-hydroxyethoxy)-2-methylpropiophenone (Ciba® IRGA-CURE® 2959, 98%), ammonium persulfate (APS, 98%), sodium hydroxide (≥98%), ammonium chloride (≥99.5%). Urease (15,000-50,000 units/g) from *Canavalia ensiformis* (Jack bean) can be purchased from Sigma-Aldrich. Calcium chloride dehydrate (ACS grade) and sodium phosphate, dibasic (≥98%) can be obtained from G-Biosciences. Nessler's reagent can be obtained from from Fluka.

In some embodiments, the hydrogel precursor based on a thermally curable PAA precursor (t-AA) described above can be prepared for a cementation localization test. In some embodiments, an EICP solution can be prepared by mixing a $CaCl_2$-urea solution with a urease solution in a 4:1 volume ratio. In some embodiments, the final concentrations of reactants in EICP solution (prepared from 1.000 M $CaCl_2$), 1.500 M urea and 0.450 g/L urease. t-AA of various volume fractions of 0, 20, 40, 50, 60, 80, and 100%), can be mixed with the EICP solution and the mixture poured onto the soil surface immediately after mixing at a dose of 3 mL/in². Control samples treated with a solution that do not contain enzyme can also be prepared with the same method. Tests can be performed using centrifuge tubes filled with fine-grained silica sand (F-60). For example, centrifuge tubes can be kept at 40° C. for 5 hours followed by incubating at room temperature (e.g., about 65° F. to 75° F.) for 14 days to allow time for the cementation reaction to take place.

In some embodiments, soil samples treated with t-AA and/or EICP solutions were first tripled rinsed with 18.2 MΩ de-ionized (DI) water and then dried at 50° C. for approximately 2 days before further testing. The rinsing facilitated the removal of unreacted reactants as well as soluble calcium-containing species. The samples were sputter-coated (e.g., using a EMS550X sputter coater) with carbon prior to SEM imaging to improve their electrical conductivity. All the SEM and EDX data was taken under 15 keV (e.g., using a Hitachi 54700 Field Emission Scanning Electron Microscope).

The water vapor pressure of the PAA solutions was measured by a monometer (Fisher Scientific™ Traceable™ Manometer). Uncrosslinked PAA was used as solute because crosslinked PAA hydrogel did not dissolve in water. Aqueous solutions containing 0.5, 1.0, 2.0 and 5.0 wt % of PAA were prepared by dissolving un-crosslinked PAA in DI water. Un-crosslinked PAA was prepared by UV polymerizing about 28.37 wt % of AA in water with about 0.71 wt % of Ciba® IRGACURE® 2959 for 60 s. The product was then incubated at 50° C. overnight to remove unreacted AA. For each measurement, 100 mL liquid was poured into a 250 mL Erlenmeyer flask. The Erlenmeyer flask was cleaned and completely dried prior to each measurement. A stopper with a glass tube was immediately plugged into the mouth of flask after PAA solution was added and the manometer was connected to the glass tube with a rubber tube. Each measurement took at least 10 min to allow the system to reach equilibrium. The saturated vapor pressure of DI water was also measured using the same procedure.

In the ammonium removal test, x-PAA was pretreated with water or pH 8.40 (Oakton™ pH/Ion Benchtop Ion 700 Meter) phosphate buffer (PB) before being applied to an ammonium containing solution. To treat x-PAA, 1 g of x-PAA was immersed in 100 mL water or PB for 24 hrs. The hydrogel was then taken out and placed in 10 mL 1 M ammonium chloride solution to test ammonium absorption. The ammonium concentration at a specific time was determined by a colorimetric method. 3 µL of ammonium containing solution was mixed with a coloring agent, which is prepared by adding 50 µL Nessler's reagent into 3 mL of DI water. The solution was gently shaken and then put into an UV-Vis spectrometer (Perkin Elmer Lambda 18) to measure its light absorption at 425 nm. Standard solutions containing 33 µM, 66 µM, 98 µM, 197 µM and 328 µM ammonium ions were prepared by diluting 1.000 M $NH_4Cl$ solution with the coloring agent. The absorption of standard solutions was measured with the same procedure to obtain a calibration curve for ammonium quantification. An ammonium retention test was conducted by placing each x-PAA gel used in the ammonium removal test in 10 mL DI water. The ammonium concentration as a function of time was determined by the same colorimetric method as used in the ammonium retention test. Sample solutions used in spectral measurements were prepared by mixing 30 µL of ammonium containing solution with 50 µL Nessler's reagent and 3 mL DI water.

Figure 1A:
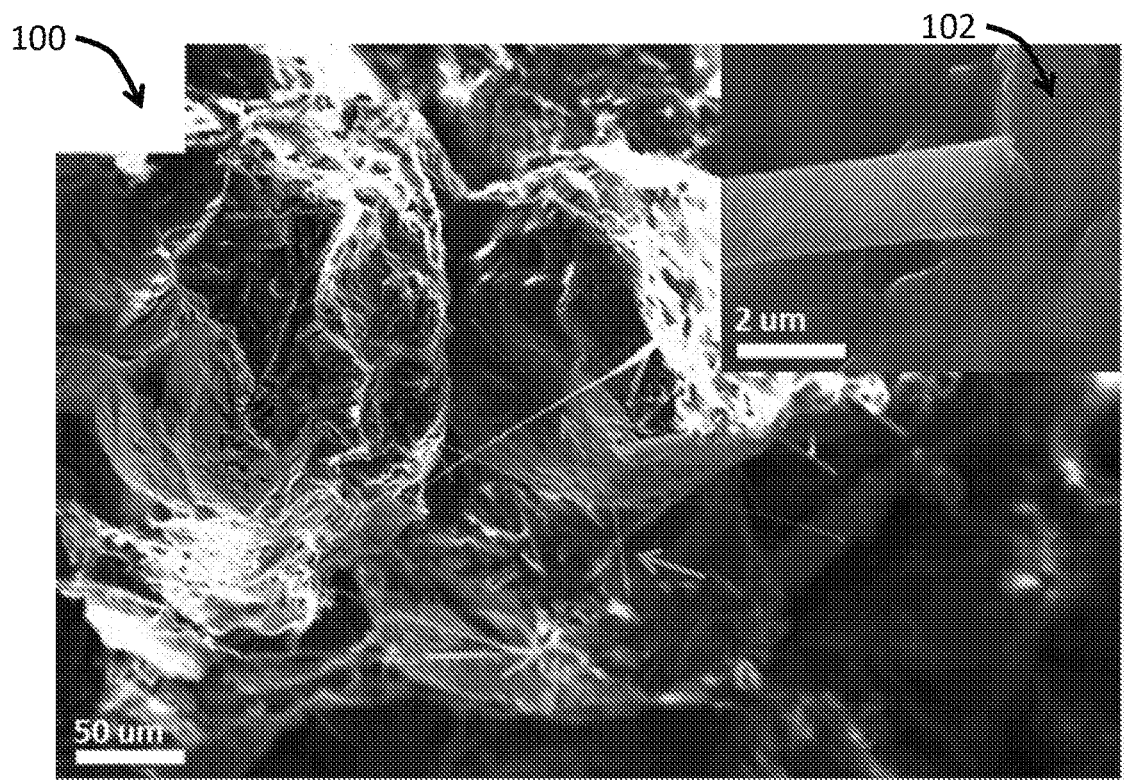
FIGS. 1A-1E show representative SEM images of sand samples treated with the synthetic hydrogel polyacrylic acid (PAA) and an EICP solution in accordance with some embodiments of the invention.
Figure 1B:
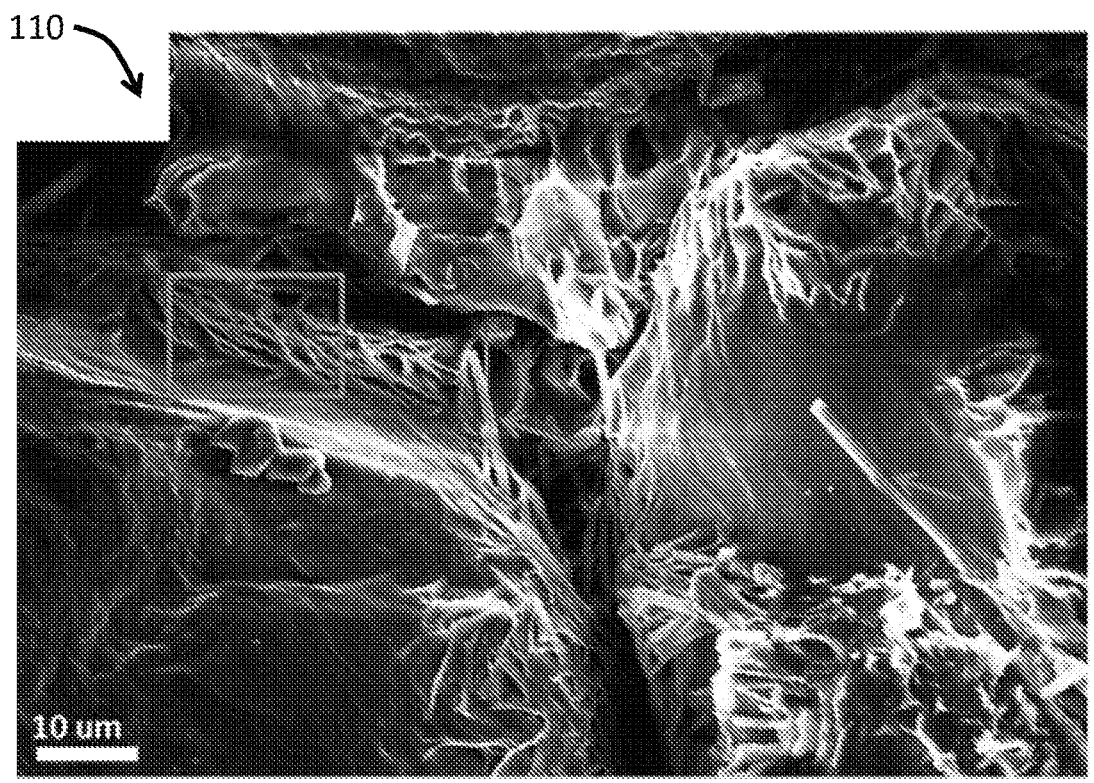
Figure 1C:
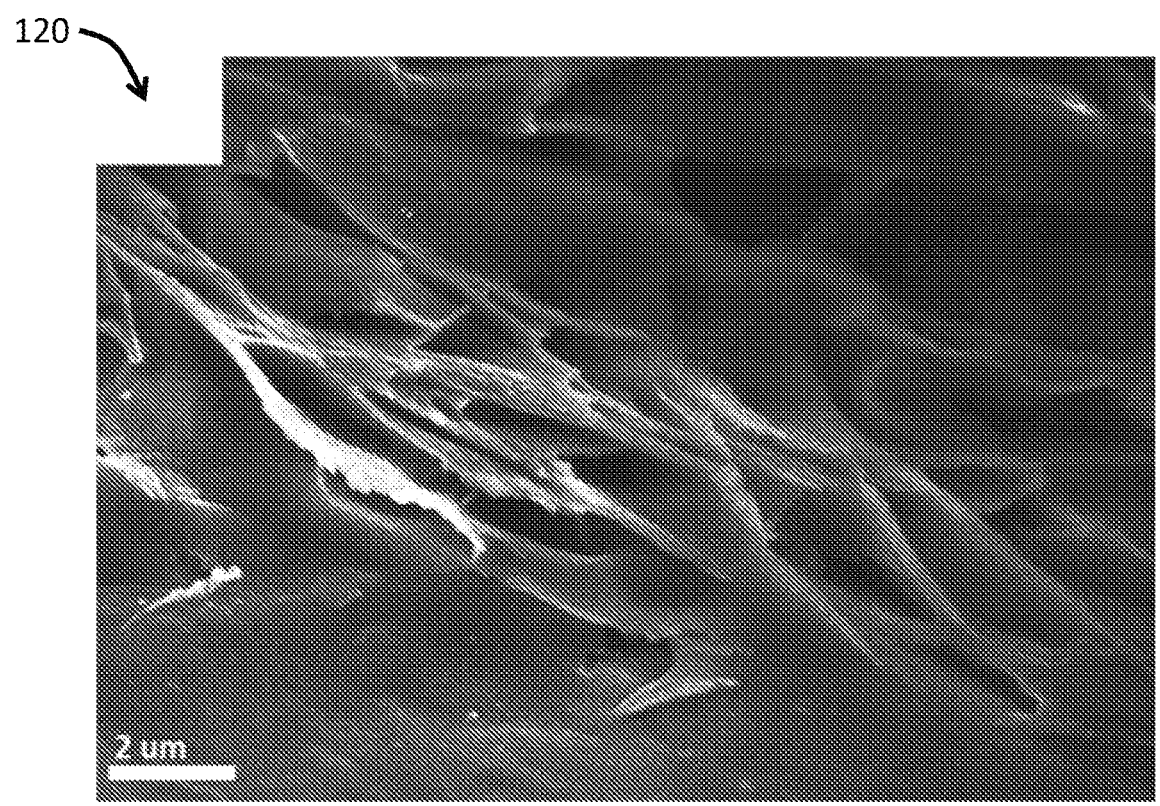
Figure 1D:
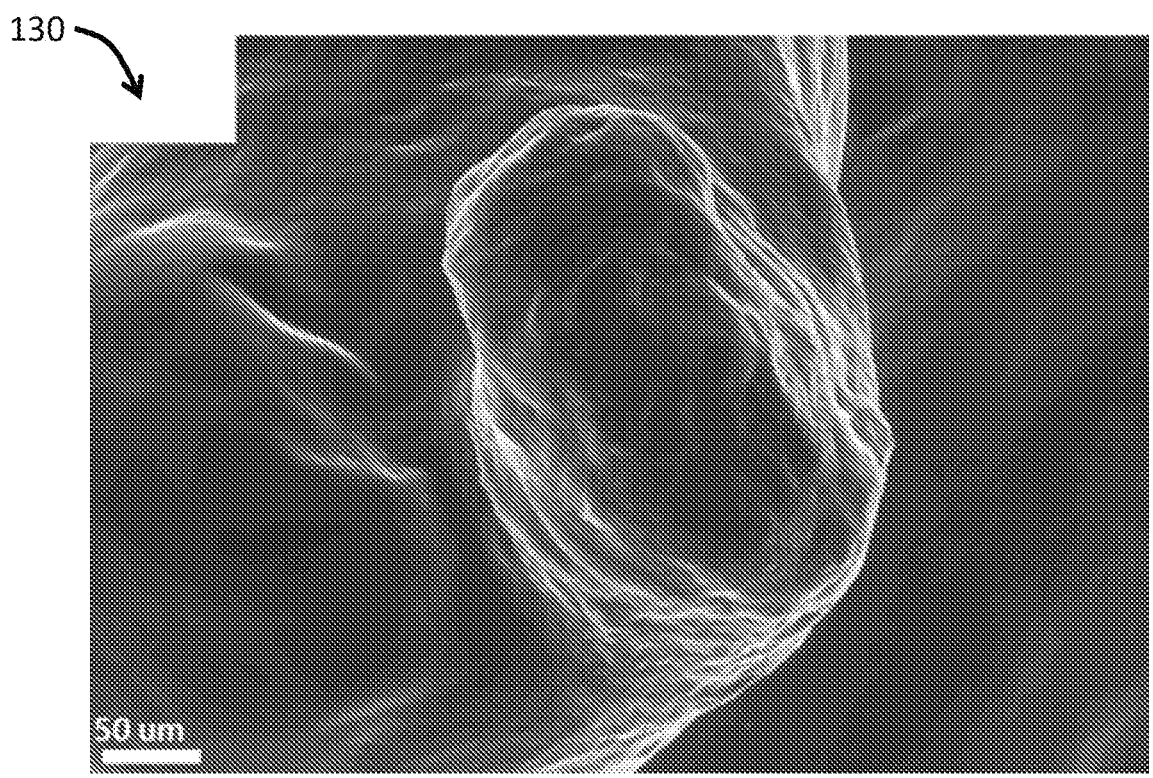
Figure 1E:
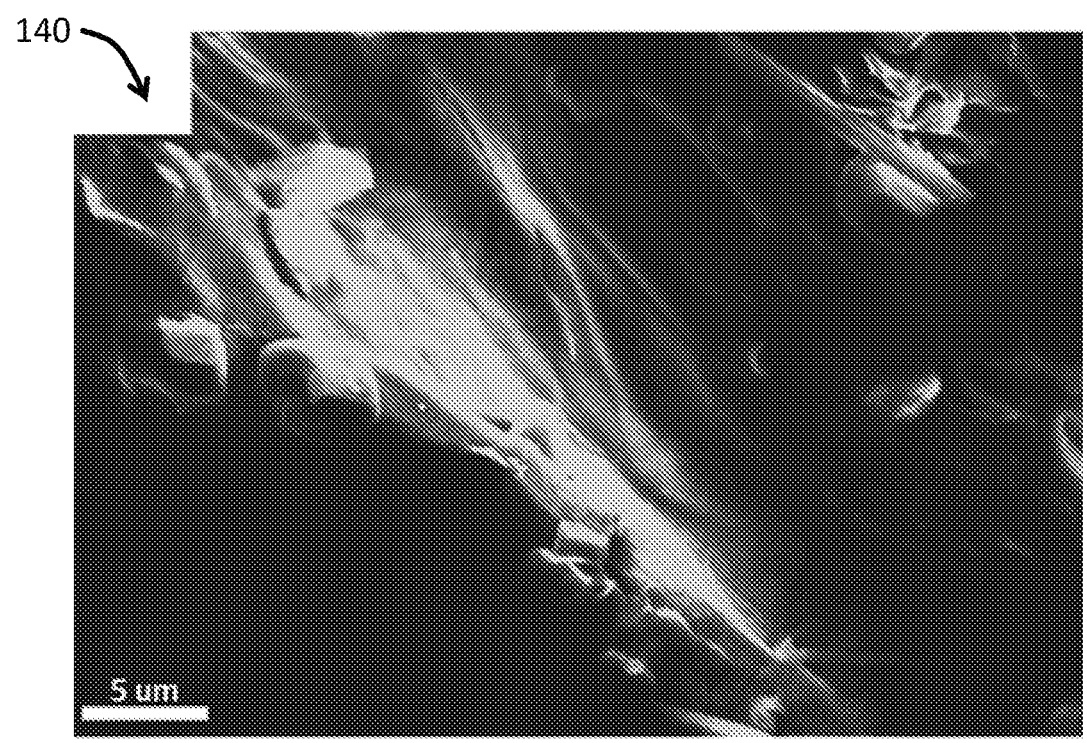
Figure 1F:
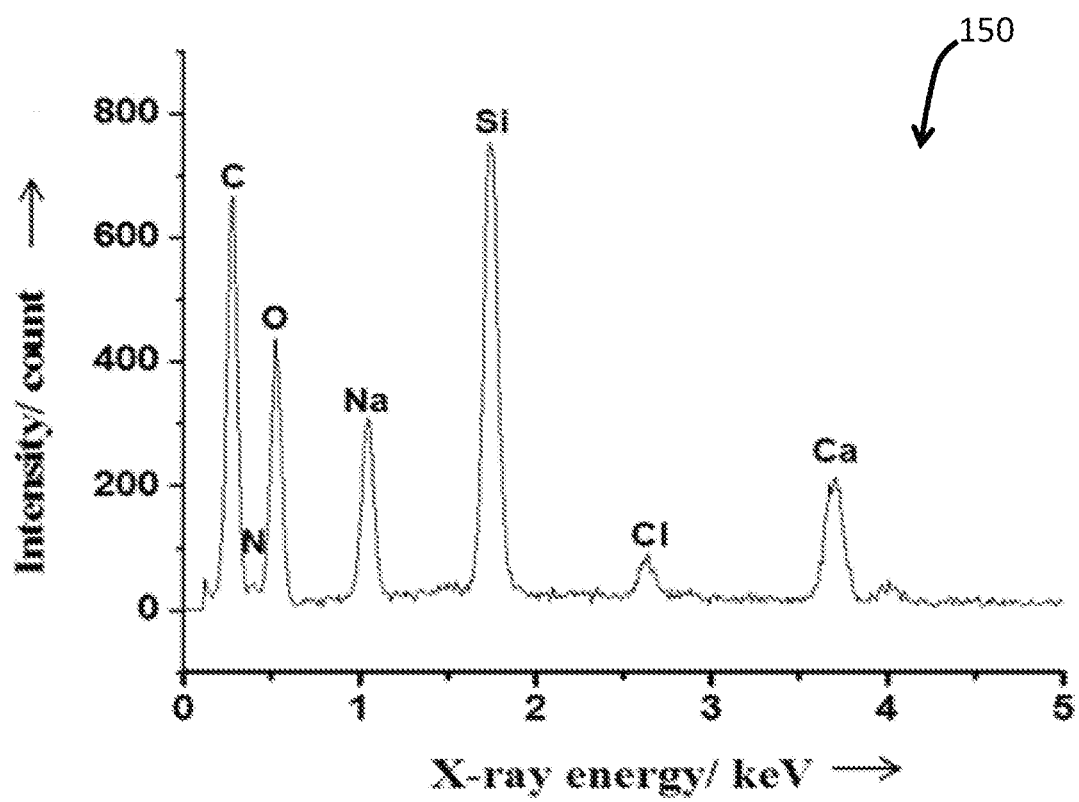
FIG. 1F shows an EDX spectrum of calcite crystals attached to the hydrogel shown in FIG. 1E solution in accordance with some embodiments of the invention.
Figure 1G:
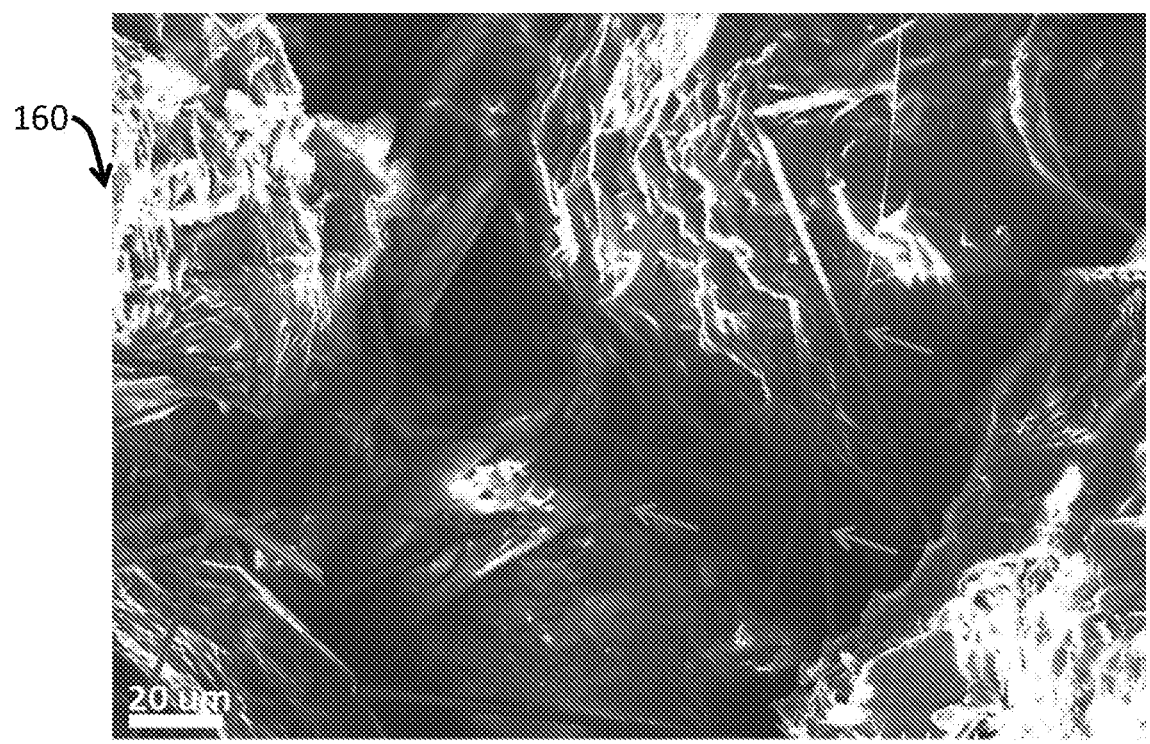
FIG. 1G shows an image of sand particles intertwined by multiple polymer filaments with arrows identifying the filaments in accordance with some embodiments of the invention.
Figure 1H:
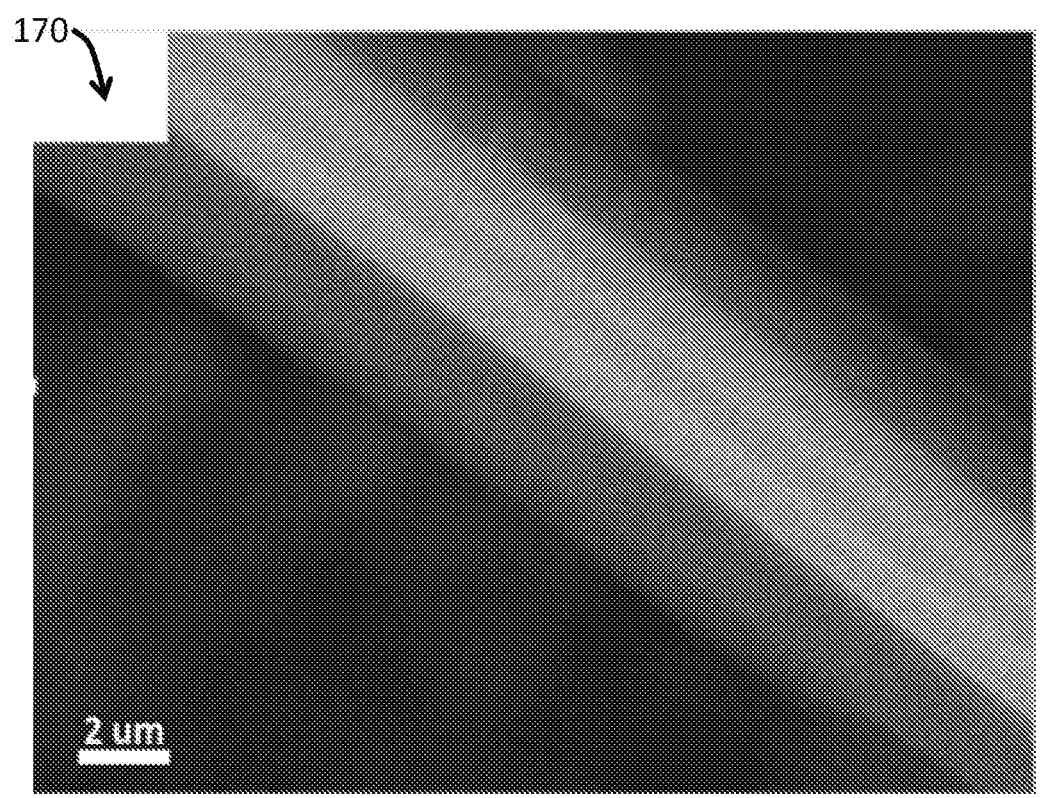
FIG. 1H shows a high resolution SEM of a polymer filament in accordance with some embodiments of the invention
Figure 1K:
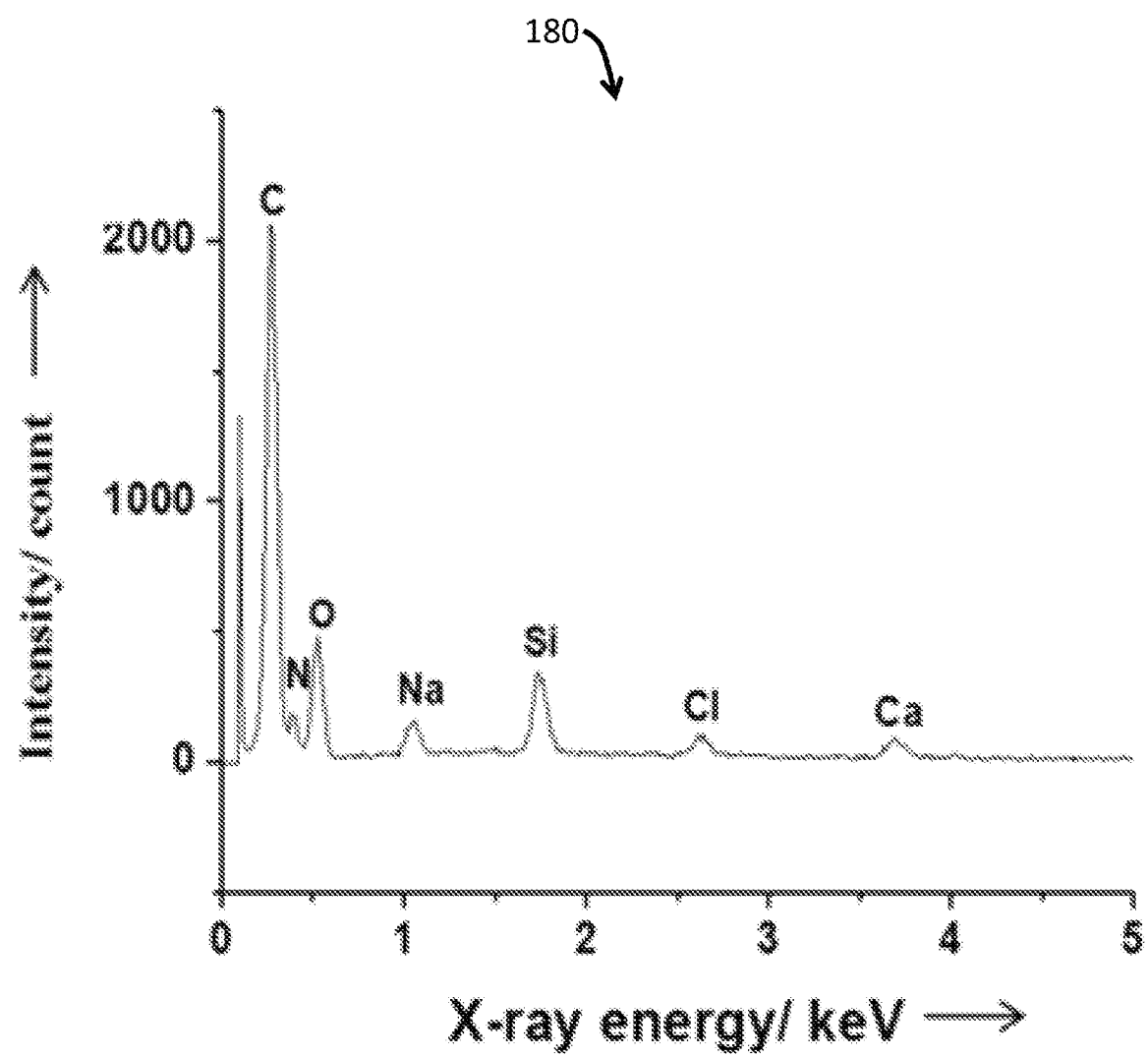
FIG. 1K shows an EDX spectrum from the region in FIG. 1H in accordance with some embodiments of the invention.

The synthesis of a biomimetic hydrogel network in the soil is the key step for a bio-mimicry approach to soil stabilization. SEM images of Ottawa Crystal Silica (F-60) sand (purchased from the US Silica Company) treated with t-AA containing solutions showed that a hierarchical, hyper-branched hydrogel structure was successfully formed through in-situ polymerization. For example, FIGS. 1A-1E show representative SEM images of sand samples treated with the synthetic hydrogel polyacrylic acid (PAA) and an EICP solution in accordance with some embodiments of the invention. The image 100 of FIG. 1A shows long polymer filaments connecting sand particles, and arrows point to some of the filaments, with the inset 102 showing a zoomed image of the joint point between the filament and bulk hydrogel. The image 110 of FIG. 1B provides a porous hydrogel structure on and between sand particles, where arrows point to some filaments. Further, the image 120 of FIG. 1C shows a magnified image of the marked rectangular region in the image 110, and the image 130 of FIG. 1D shows an SEM image of a natural gel (xanthan gum). Further, the image 140 shown in FIG. 1E illustrates calcite crystals attached to the hydrogel. Further, FIG. 1F shows an EDX spectrum 150 of calcite crystals attached to the hydrogel shown in FIG. 1E solution in accordance with some embodiments of the invention. Filaments that were a few microns in diameter and hundreds of micron long were found to exist between sand particles (image 100 of FIG. 1A). Those filaments grew directly from amorphous polymer layers and connected multiple, well separated sand particles. Each individual particle might have many filaments attached, leading to a major network similar to the well spreading taproot (e.g., see image 160 of FIG. 1G showing sand particles intertwined by multiple polymer filaments with arrows identifying the filaments in accordance with some embodiments of the invention). EDX confirmed that the filaments were rich in carbon, which indicated its polymeric nature (e.g., see image 170 of FIG. 1H showing a high resolution SEM of polymer filament, and FIG. 1K showing an EDX spectrum 180 from the region in FIG. 1H in accordance with some embodiments of the invention). Furthermore, a porous hydrogel structure covered most surfaces of individual sand particles and effectively filled up the inter-particle spaces between adjacent sand particles, providing a good analog to localized subsidiary roots (image 100 of FIG. 1A). The porous structure showed a highly cross-linked appearance with an average pore size of ~2 micron (image 120 of FIG. 1C). It is worthwhile to note that the porous structure was interconnected by hydrogel filaments and their joint points were revealed by SEM (image 110 of FIG. 1B), which suggests that the two different hydrogel structures can be expected to work as a unified system, i.e., as an "artificial root" system.

The filament-connected porous polymer network obtained with the novel approach described herein is consistent with a desired characteristic of synthetic hydrogels. Other work shows that natural gels or biopolymers (normally non-crosslinked) only form amorphous structures with a much smoother appearance and without sub-microstructures (image 130 of FIG. 1D). The long filaments we observed in the work described herein were postulated to form via metal ion mediated assembly of polymer chains, as previous research showed that organic ligands, such as carboxyl groups, could form complexes with various cations, including $NH_4^+$, $Mg^{2+}$, $Ca^{2+}$ through complexation or electrostatic interactions. In our reaction system, the concentration of metal ions was in the level of moles per liter, which should be sufficient to affect polymer assembly.

With its unique structure and chemical composition, the "artificial root" system can be expected to work in a similar manner as plant roots to realize the following functions in soil stabilization. First, the physical enwrapping of soil particles with polymer filaments and the porous polymer structure, as well as the chemical interactions between soil particles and the hierarchical network (e.g. van der Waals force, hydrogen bonding), can help the formation of soil aggregates and sustain external stresses. Second, the porous hydrogel structure containing carboxyl groups can favor water/reactant retention and ion absorption, which resembles the biological functions of plant roots. Experiments described herein indicated that there appeared to be no interference between hydrogel polymerization and EICP. As can be seen in FIG. 1E, image 140, mineral crystals grew on the surface of hydrogel when F-60 soil samples were treated with a mixture of t-AA and EICP solution. EDX data confirmed that the major form of those crystals was calcium carbonate (FIG. 1F, and Table 1 below). Therefore, the bio-mimicry hydrogel system can provide multi-functional enhancements to EICP. These enhancements are described as follows:

TABLE 1

Atomic percentage of all the elements presented in PAA treated sand

| Element | C | N | O | Na | Si | Cl | Ca |
|---|---|---|---|---|---|---|---|
| Atom % | 58.07 | 7.33 | 21.32 | 3.67 | 6.09 | 0.66 | 2.66 |

Figure 2A:
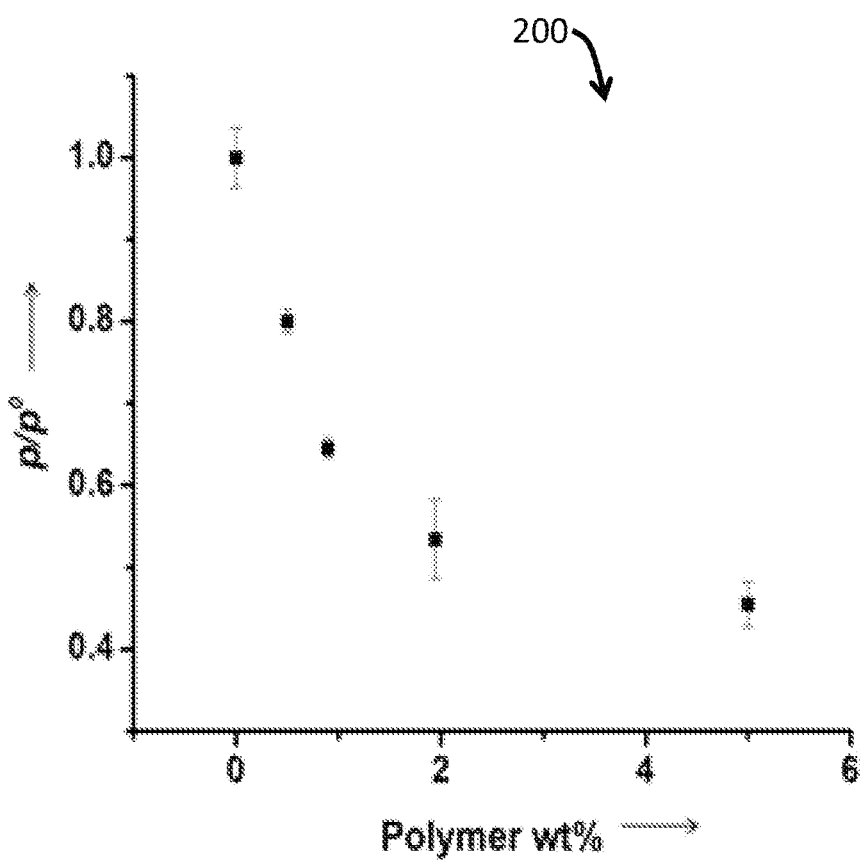
FIG. 2A shows the normalized vapor pressure change of different polymer solutions under various concentrations in accordance with some embodiments of the invention.

Since water is a necessary reactant in EICP, employing water-laden hydrophilic molecules (e.g., PAA) will help retain water longer in the reaction system and reduce water loss due to diffusion/evaporation so as to facilitate calcite precipitation. It is observed that it requires a longer time (~14 days) for the PAA-EICP solution to completely dry compared to the drying time for pure EICP solutions. The water retention ability of a compound can be quantitatively reflected by its interaction with water molecules, which may be measured via vapor pressure measurement. The vapor pressure of a binary solution is determined by solute concentrations and the specific interactions between solute and solvent. To test the water retention ability of PAA, solutions of different PAA concentrations were prepared and their equilibrium water vapor pressures (p) were measured. Normalized vapor pressure ($p/p^0$) of the PAA solutions was plotted against PAA weight percent, where $p^0$ is the saturated vapor pressure of pure water (plot 200 in FIG. 2A). A significant drop of vapor pressure was found for PAA containing solutions compared to that of pure water. Experimental results showed that PAA could lower the vapor pressure by ~20% at a very low PAA concentration (0.5 wt %). The maximum vapor pressure drop was found to be ~55% under the highest PAA concentration (5 wt %).

According to Flory-Huggins theory on polymer solutions, solvent activity of a macromolecule solution can be defined by the following equation:

$$\ln a = \chi_{i-j}\Phi_p^2 + \ln(1-\Phi_p) + \left(1 - \frac{V_i}{V_j}\right)\Phi_p \tag{1}$$

where "a" is solvent activity, "$\Phi p$" is the volume fraction of polymer, "$\chi_{i-j}$" is the interaction parameter of the system, and "$V_i$" and "$V_j$" are the molar volumes of the solvent and polymer (respectively). The value of $\chi_{i-j}$ can be used to quantify solvent-polymer interactions. By definition, $\chi_{i-j}$ is proportional to the molar enthalpy change ($\Delta H_m$) induced by the solvent-polymer interaction (i.e., $\chi_{i-j} \propto \Delta H_m$). A negative $\chi_{i-j}$ value means the polymer possesses positive water retention ability. The more negative $\chi_{i-j}$ value is, the stronger the solvent-polymer interaction will be which leads to greater water retention.

The solvent activity ("a") for a polymer solution is the same as $p/p^0$, the normalized vapor pressure that was determined above for the three aforementioned hydrogels. By rearranging equation (1) to solve for solvent activity in terms of the interaction parameter we get:

$$\ln a - \ln(1-\Phi_p) - \left(1 - \frac{V_i}{V_j}\right)\Phi_p = \chi_{i-j}\Phi_p^2 \tag{2}$$

Figure 2B:
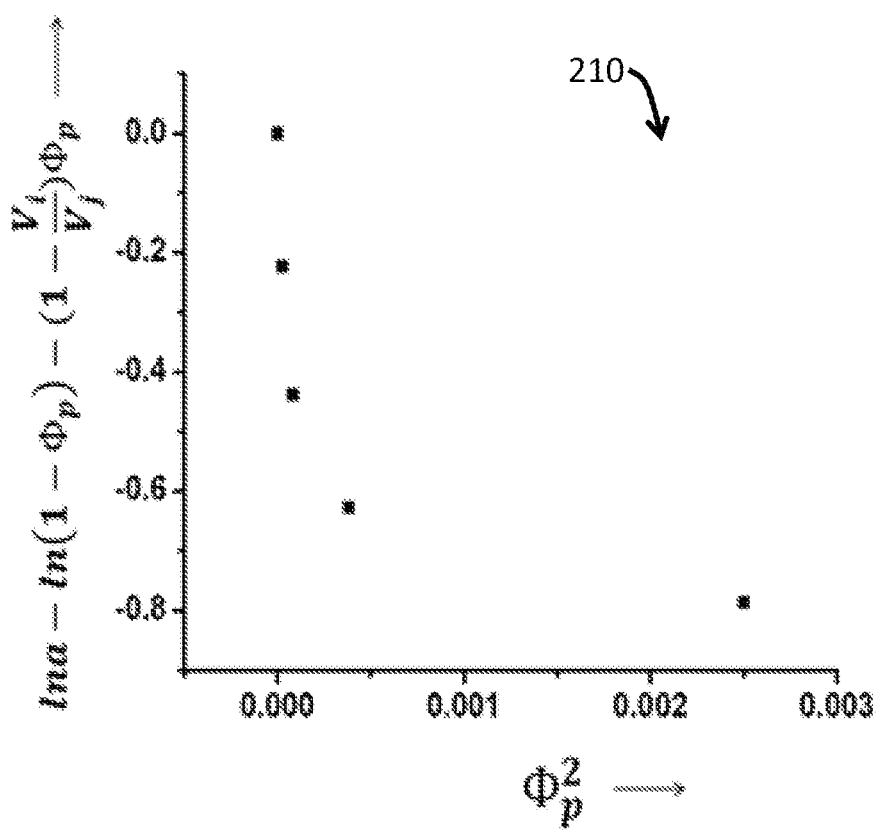
FIG. 2B shows plots of the difference between the natural log of solvent partial pressure and the entropic contribution versus $\Phi p^2$ (where "$\Phi p$" is the volume fraction of a polymer in the binary solution) in accordance with some embodiments of the invention.

The plot 210 of FIG. 2B shows that the $\chi_{i-j}$ values are always negative, indicating the retention of water molecules by PAA is energetically favorable. This is likely due to the carboxyl rich structure of the PAA. Hydrogen bonds formed between carboxyl groups and water molecules can hold water to the polymer chain and reduce evaporation. Water retention tests demonstrated that the strong water affinity of PAA was able to hold water inside the reaction system for a longer time. Although the tests were based on un-cross-linked PAA, the results may also be applied to cross-linked hydrogels (e.g., x-PAA). It is known that crosslinked polymers are better able to hold water because of the confinement effect induced by polymer networks. Therefore, x-PAA is expected to provide even better water retention than PAA.

To ensure the successful in-situ formation of an "artificial root" system, and for the convenience of future field applications of a hydrogel-enhanced soil stabilizer, the following criteria needed to be met by the thermal-curable hydrogel precursor: (1) a sufficient polymerization reaction rate at ambient conditions; and (2) appropriate diffusion and permeation behavior to allow for filling up of the inter-particle spaces in the soil. To fulfill these goals, the optimal concentration of APS and Bis in t-AA for stabilization of surficial soils can be obtained through a series of concentrations based on commonly known polymerization kinetics. With this optimal concentration in this study, the t-AA precursor spontaneously was cured within 5 hours at 40° C. (see images 300 of FIG. 3A). This temperature is commonly seen at surficial soils in warm seasons. When a different environmental temperature exists, the compositions can be tuned accordingly in a similar manner to obtain a desirable curing speed. During the gravity-driven permeation of a t-AA solution into soil, the thermal initiator can gradually initiate the polymerization leading to increasing viscosity with time that should then slow down the diffusion of t-AA. We have observed that the entire precursor was able to diffuse in soil in about 3 hours, which was slightly shorter than the gelation time of plain hydrogel (well controlled at about 4 to 5 hours). This small difference in time between the completion diffusion and gelation would allow the entire precursor to enter soil and at the same time prevent it over-penetrating into deep regions within the ground.

With the above described hyper-branched structure and water-retaining capability, in-situ formed hydrogel networks can provide a viscous, water-laden reaction matrix for the EICP aqueous solution and localizes the EICP process at the soil surface. After t-AA containing EICP solution was applied onto a soil surface, the odor of $NH_3$ was detected in the headspace, indicating that urea hydrolysis was occurring. The reaction mixture was observed to be restricted within the upper layer of soil, indicating that hydrogel can effectively facilitate the retention of the reactants at the targeted location. As a result, a surficial soil crust was formed in all tubes where the reaction mixture was added (see images 310 and 320 of FIGS. 3B and 3C). The addition of t-AA limited solution penetration to less than 13 mm, while pure EICP reagent penetrated deeper ($\geq$14 mm) into the soil. The viscosity of the EICP-hydrogel solution was proportional to the volume fraction of t-AA.

Figure 4:
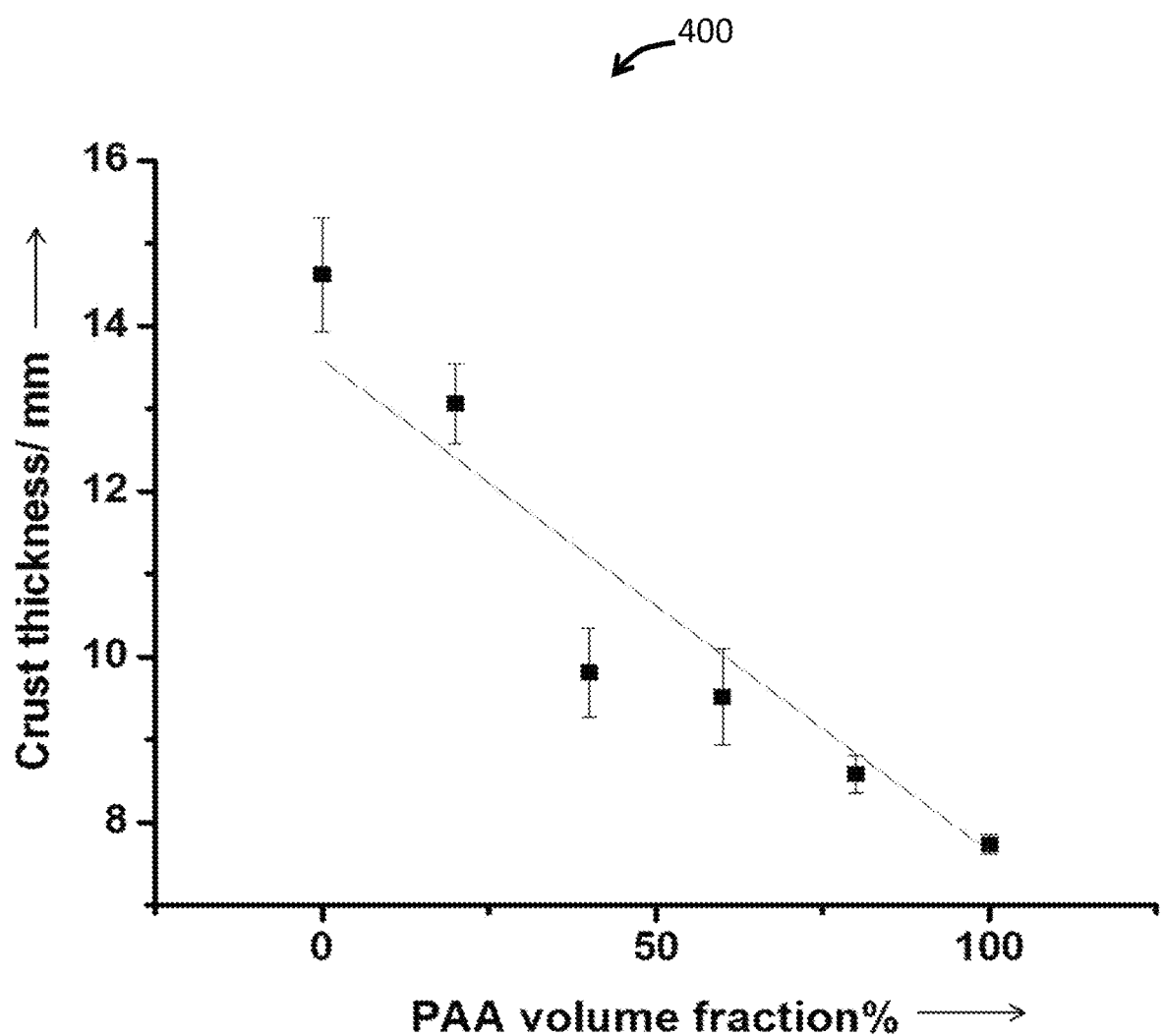
FIG. 4 shows the relationship between a thermally curable PAA precursor (t-AA) volume ratio in the EICP solution and its penetration depth.

To further illustrate that the localization of the EICP solution was determined by solution viscosity, mixtures of different EICP and t-AA volume ratios were tested in the same manner as previously described. It was found that the soil crusts that formed with high t-AA volume fractions were generally thinner and more well-defined than crusts that formed using low t-AA volume fractions, demonstrating that the localization of EICP in the upper layer of soil was primarily due to the effect of viscosity on penetration. The relationship between t-AA volume fraction and crust thickness is shown in the plot 400 of FIG. 4. The results show that the water-laden matrix formed by the EICP-hydrogel solution has focused the $CaCO_3$ precipitation near the soil surface via a temporary reduction in soil permeability. In some embodiments, this can lead to greater enzyme substrate utilization and $CaCO_3$ precipitation and, thereby, improved EICP efficiency. Furthermore, the increased viscosity of a hydrogel containing EICP solution temporarily slowed the off gassing of $CO_2$ and $NH_3$, further enhancing the EICP process.

Mechanical property tests using the fall cone apparatus, an index test commonly used to establish the shear strength of cohesive soil specimens, further demonstrated the enhancement of soil strengthening with the use of a hydrogel. In the fall cone test, a conical probe of a specified weight and dimension is dropped from a specified height, and the penetration of the cone is correlated to the strength of the soil specimen. In some embodiments, it was shown that the penetration of the $CaCO_3$ precipitate layer by the fall cone probe was correlated with the t-AA volume ratio in the EICP solution. As the t-AA volume ratio increased, the fall cone probe penetrated less, i.e., the soil crust became harder. The fall cone testing showed that for a volume ratio of t-AA$\geq$40%, no penetration was observed even with the most aggressive cone (see Table 4 below). In comparison, untreated sand had almost no pressure resistance to the fall cone while EICP-only treated soil was only able to resist between $10^0$ to $10^1$ kPa pressures. The hardest soil crust, formed with the addition of pure PAA precursor, appeared to withstand contact pressures of at least $4.1 \times 10^3$ kPa as measured by a cutting test. The ultra-high strength achieved using hydrogel assisted EICP was comparable to cement materials and has never been seen in previous EICP or hydrogel assisted EICP experiments. We attribute such extraordinary strength enhancement to the continuous, root-like network structure of PAA. At a molecular level, polymer chains in the hydrogel were held together through strong covalent bonds (instead of the weak Van der Waal force in synthetic non-crosslinked polymers and biopolymers), resulting in a highly stable polymeric structure. Microscopically, the hierarchical network helped to retain soil aggregations when displacement of various length scales happened between soil particles.

Figure 5A:
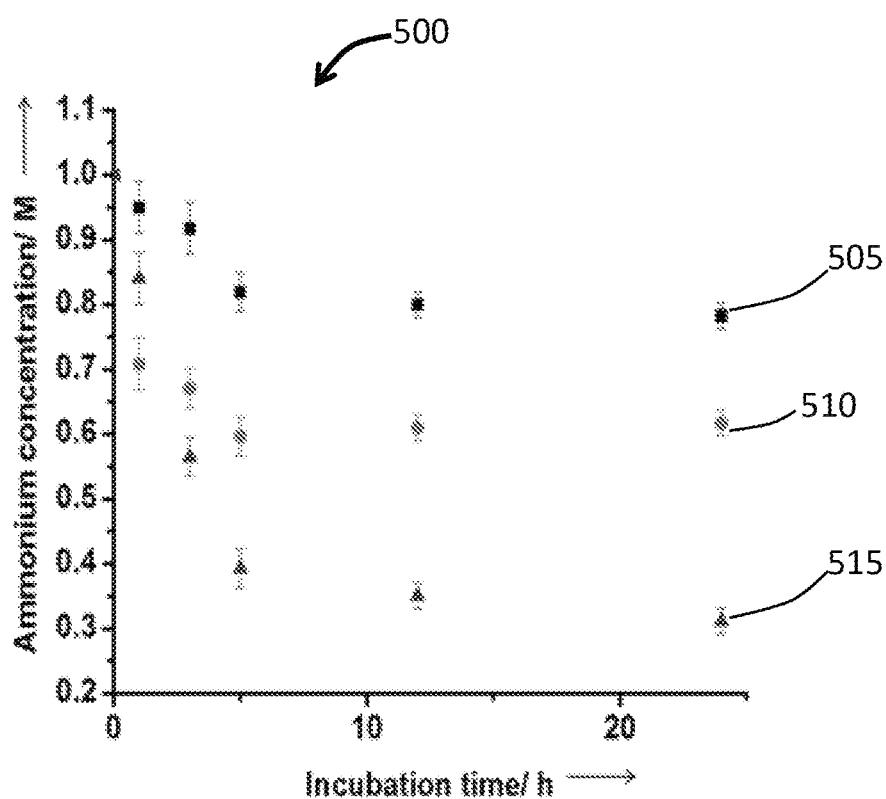
FIG. 5A illustrates ammonium concentration against incubation time after the addition of various PAA gels. (■) PAA with no treatment, (●) PAA treated by water, (▲) PAA treated by phosphate buffer.
Figure 5B:
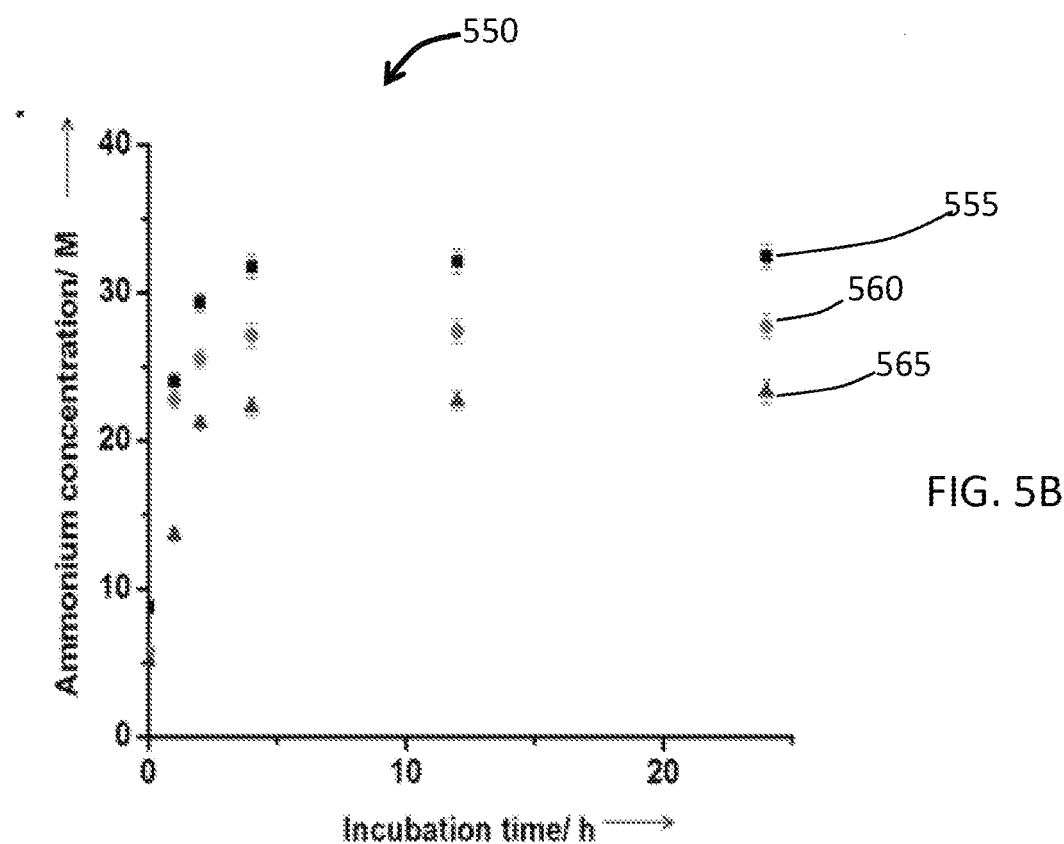
FIG. 5B illustrates ammonium release against incubation time for various PAA gels. (■) PAA with no treatment, (●) PAA treated by water, (▲) PAA treated by phosphate buffer.

In some embodiments, the soil stabilization capability of hydrogel-assisted EICP is enabled by the adsorption of the ammonium ion byproduct by the hydrogel. Tests were performed to demonstrate that hydrogel has the ability to mitigate this undesired byproduct from EICP process. For example, 1 g PAA was pretreated with various agents, and then immersed in 10 mL of a standard aqueous solution of 1M ammonium. The ammonium concentration in all solutions was determined by a colorimetric method using Nessler's reagent. After adding PAA, the ammonium concentration dropped quickly for the first few (e.g., 5 to 10) hours, and then leveled out (see plot 500 of FIG. 5A showing data 505 for PAA, no treatment, data 510 for PAA, water treated, and data 515 PAA, PB treated). PAA gel showed an excellent ability for absorbing ammonium ions and the ammonium removal rate could reach up to 70%. It was found that the ammonium removal rate could be tuned by pretreating the hydrogel with different agents. Phosphate buffer-treated hydrogel possessed the highest ammonium removal ability. Water treated hydrogel also showed fair retention of ammonium ions while untreated PAA appeared to only have weak ammonium absorption. After removal from the ammonium solution, all of the hydrogels were rinsed with water to test their ammonium retention ability. Only mM level of ammonium was released from any of the samples, demonstrating that the fixation of ammonium was relatively stable and could sustain moderate precipitation (plot 550 of FIG. 5B showing data 555 for PAA, no treatment, data 560 for PAA, water treated, and data 565 PAA, PB treated). The presence of ammonium in soil samples treated with PAA-assisted EICP after washing is evident by the high N ratio in the EDX spectrum (plot 150 of FIG. 1F).

In some further embodiments, ready-formed hydrogel materials can be applied to soils. For example, some embodiments of the invention can utilize one or more naturally occurring biopolymers such as xanthan gum and guar gum and an inert polyol-cellulose hydrogel. Xanthan gum and guar gum are polysaccharide biopolymers. In some embodiments, the inert polyol-cellulose hydrogel is a polysaccharide polymer composed mostly of methyl cellulose and glycerol. Other natural gums can be used (either alone or in combination). For example, some embodiments include acacia tragacanth, alginates, chitosan, xanthan, pectin and others. Other gums can include agar-agar, alginate, carrageenan, *cassia* gum, cellulose gum such as carboxymethyl cellulose (CMC), gellan gum, guar gum, hydroxypropyl cellulose, Konjac gum, locust bean gum (or Carob bean gum), most any plant-derived methylcellulose and hydroxypropyl methylcellulose, microcrystalline cellulose (MCC), or pectin. Some embodiments can include "K-Y JELLY". "K-Y JELLY" is a registered trademark of Johnson & Johnson.

Some embodiments of the invention include biodegradable biopolymer hydrogels xanthan and guar gum and an inert polyol-cellulose hydrogel. Conventional xanthan gum and guar gum were obtained from commercial sources in powder form and polyol-cellulose hydrogel was procured in liquid form. For testing and preparation of hydrogels, high and low concentration solutions of urea and calcium chloride dihydrate ($CaCl_2 \cdot 2H_2O$, Sigma Aldrich laboratory grade) were prepared in reverse osmosis-purified (RO) water at about pH=9.40 as follows to achieve an initial urea to $CaCl_2$) ratio of 1.5:1: (1) a 200 ml "high concentration" solution consisting of 3.0 M urea and 2.0 M $CaCl_2 \cdot 2H_2O$; and (2) a 200 ml "low concentration" solution consisting of 0.6 M urea and 0.4 M $CaCl_2 \cdot 2H_2O$. The following two grades of urease enzyme were used in these experiments, each prepared in RO water containing 4.0 g/L stabilizer: (a) Sigma Aldrich high-activity Type III Jack Bean, 26,100 units/gram average activity, defined herein and in Tables 1 and 2 as "high activity" enzyme and (b) Fisher Chemical low-activity Jack Bean≈200 units/gram, defined herein and in Tables 1 and 2 as "low activity" enzyme. A unit of urease enzyme is defined as the amount of enzyme that will liberate 1.0 mmole of $NH_3$ from urea per minute at pH 7.0 at 25° C. The enzyme solutions were prepared to reach target concentrations of 0.44 g/L for the high-activity urease enzyme and a 0.85 g/L for the low-activity urease enzyme when added to the urea-$CaCl_2$) solutions.

A test that employed either xanthan gum or guar gum proceeded by adding approximately 15 ml of urea-$CaCl_2$) solution into a 50-ml glass beaker and then slowly adding the hydrogel powder under high-speed stir at approximately 60° C. Tests that used xanthan gum and guar gum received approximately 0.2 g and 0.3 g of hydrogel powder (respectively) per 15-ml of high concentration urea-$CaCl_2$) solution, and 0.05 g and 0.1 g of powder (respectively) per 15 ml of low concentration urea-$CaCl_2$) solution. After the hydrogel powder appeared to be fully dissolved (i.e. little to no solids visible), 3 ml of urease enzyme solution was added to the beaker while stirring. The percent weight of hydrogel solids after adding 3 ml of urease solution to the high concentration urea-$CaCl_2$) solutions was approximately 1.1% w/w (0.2 g) for xanthan gum and 1.6% (0.3 g) for guar gum (assuming a $CaCl_2$)-urea solution density of ≈1 g/ml). The percent of hydrogel solids by weight for the low concentration urea-$CaCl_2$) solutions was approximately 0.2% w/w (0.05 g) for xanthan and 0.5% (0.1 g) for guar gum. The polyol-cellulose hydrogel experiments proceeded by adding approximately 15 ml of urea-$CaCl_2$) solution into a 50-ml glass beaker and then adding 3 ml of diluted liquid polyol-cellulose hydrogel (50/50 RO water to hydrogel). Next, 3 ml of urease enzyme solution was added to the beaker while stirring. The hydrogel-urea-$CaCl_2$)-enzyme solutions (i.e., the complete hydrogel-EICP solutions, 18 ml in volume) were stirred for approximately 30 seconds after adding the enzyme solution.

To evaluate various hydrogel-EICP compositions, one experiment was set-up using seven 50-ml glass beakers to evaluate hydrogel-assisted EICP without the complication of soil (Table 2). A second experiment was set up using 15 un-waxed 89 ml tapered paper cups filled with clean F-60 sand (mean grain size 0.275 mm, coefficient of uniformity 1.74) to assess the applicability of hydrogel-assisted EICP for surficial stabilization of soils (Table 3). The paper cups were approximately 55 mm high with an opening at the top of approximately 50 mm in diameter. Approximately 100 grams of F-60 sand was added to the empty cups using a funnel (drop height≈25 mm) and filled to a height of approximately 15 mm below the rim. The cups were then gently shaken in order to level the sand in the cups and then sand was added or removed as necessary to achieve a uniform depth of 15 mm below the rim of the cup. The results of the hydrogel-$CaCO_3$ experiments in the soil filled paper cups are summarized in Table 4. The presence of carbonate was detected by acidification in the glass beaker precipitates and soil crusts of all specimens that received enzyme solution, indicating that hydrogel-assisted EICP does not prevent carbonate precipitation. However, Cups #1 and #2 that used guar gum and Cups #7, #8, and #10 that used polyol-cellulose hydrogel had to be tested in several locations before carbonate was detected (this is indicated by an asterisk in Table 4). Carbonate was not detected in any of the control specimens.

In the paper cup experiments (Table 3), the hydrogel-urea-$CaCl_2$)-enzyme solutions (i.e., the complete hydrogel-EICP solutions, 18 ml in volume) were poured onto the soil after stirring the solution for approximately 30 seconds. Since the hydrogel-EICP solution was viscous and tended to stick to the beaker, less than the entire 18 ml of solution was added to the paper cups. It was estimated that approximately 10 to 12 ml of solution was poured from the glass beakers into the soil-filled paper cups. In three of the 15 cups, high concentration hydrogel-urea-$CaCl_2$) controls were set-up, one each using xanthan gum, guar gum, and polyol-cellulose hydrogel in paper cups with soil but without enzyme solution (3 ml of RO water was used instead). Note that the initial urea-$CaCl_2$) concentrations of 2.0 M $CaCl_2$) and 0.40 M $CaCl_2$) were reduced to 1.66 M and 0.33 M (respectively) by the addition of 3 ml of urease solution (or RO water for the control cups).

The seven soilless glass beakers (data shown in Table 2) and 15 paper cups containing soil (data shown in Table 3) were loosely covered and allowed to stand for seven days. Because they remained hydrated at the end of the 25 day air drying period, the guar gum and xanthan gum EICP specimens in the beakers were dried in an oven for 24 hours at approximately 90° C. before further testing. Summaries of the chemical formulations, enzyme activities (high/low), and types of hydrogel used in the soilless glass beakers and soil filled paper cups are shown in Tables 1 and 2 (respectively).

TABLE 2

Summary of the chemical formulations, enzyme activities, and types of hydrogel used in the soilless glass beakers
Glass Beakers without Soil

| Test | Beaker # | [$CaCl_2$] | Enzyme Activity |
| --- | --- | --- | --- |
| Polyol- | 20 | 2.0M | Low |
| cellulose | 21 | 2.0M | High |
| Guar Gum | 17 | 2.0M | Low |
| | 19 | 2.0M | High |
| | 22 | 2.0M | — |

TABLE 2-continued

Summary of the chemical formulations, enzyme activities, and types of hydrogel used in the soilless glass beakers
Glass Beakers without Soil

| Test | Beaker # | [CaCl$_2$] | Enzyme Activity |
|---|---|---|---|
| Xanthan Gum | 16 | 2.0M | Low |
|  | 18 | 2.0M | High |

Table 2 shows a summary of the chemical formulations, enzyme activities, and types of hydrogel used in the soilless glass beakers. "High" and "low" enzyme activities correspond to approximately 26,100 units/gram and 200 units/gram, respectively. A unit of urease enzyme is defined as the amount of enzyme that will liberate 1.0 mmole of NH$_3$ from urea per minute at pH 7.0 at 25° C. The dashed line indicates the control specimen.

TABLE 3

Summary of the chemical formulations, enzyme activities, and types of hydrogel used in the soil filled paper cups.
Paper Cups with F-60 Sand

| Test | Cup # | [CaCl$_2$] | Enzyme Activity |
|---|---|---|---|
| Polyol-cellulose | 7 | 2.0M | Low |
|  | 8 | 2.0M | High |
|  | 9 | 2.0M | — |
|  | 10 | 0.4M | Low |
|  | 11 | 0.4M | High |
| Guar Gum | 1 | 2.0M | Low |
|  | 2 | 2.0M | High |
|  | 3 | 2.0M | — |
|  | 12 | 0.4M | Low |
|  | 13 | 0.4M | High |
| Xanthan Gum | 4 | 2.0M | Low |
|  | 5 | 2.0M | High |
|  | 6 | 2.0M | — |
|  | 14 | 0.4M | Low |
|  | 15 | 0.4M | High |

Table 3 shows a summary of the chemical formulations, enzyme activities, and types of hydrogel used in the soil filled paper cups. "High" and "low" enzyme activities have the same meaning as in Table 2. Dashed lines indicate control specimen.

TABLE 4

Summary of the EICP solution penetration depth, crust thickness, and the perceived hardness of the crusts.
Paper Cups with F-60 Sand

| Test | Cup # | Carbonate Present | Solution Penetration Depth (mm) | Approximate Crust Thickness & Relative Hardness | [CaCl$_2$] | Enzyme Activity |
|---|---|---|---|---|---|---|
| Polyol-cellulose | 7 | Yes* | 40 | 2-mm, soft | 2.0M | Low |
|  | 8 | Yes* | 40 | 2-mm, soft | 2.0M | High |
|  | 9 | No | 40 | None | 2.0M | — |
|  | 10 | Yes* | 25 | 2-mm, medium | 0.4M | Low |
|  | 11 | Yes | 25 | 2-mm, medium | 0.4M | High |
| Guar Gum | 1 | Yes* | 25 | 2-mm, soft | 2.0M | Low |
|  | 2 | Yes* | 13 | 10-mm, hard | 2.0M | High |
|  | 3 | No | 17 | 2-mm, soft | 2.0M | — |
|  | 12 | Yes | 10 | 10-mm, hard | 0.4M | Low |
|  | 13 | Yes | 10 | 10-mm, hard | 0.4M | High |
| Xanthan Gum | 4 | Yes | 15 | 10-mm, hard | 2.0M | Low |
|  | 5 | Yes | 15 | 10-mm, hard | 2.0M | High |
|  | 6 | No | 40 | 2-mm, soft | 2.0M | — |
|  | 14 | Yes | 25 | 5-mm, hard | 0.4M | Low |
|  | 15 | Yes | 15 | 12-mm, hard | 0.4M | High |

TABLE 5

Penetration depth of soil samples in fall cone test treated with EICP/t-AA mixture.

| Sample composition | Cone 1 (10 g/60°) | Cone 2 (60 g/60°) | Cone 3 (100 g/30°) | Cone 4 (400 g/30°) | Approx. shear strength (kPa) |
|---|---|---|---|---|---|
| F-60 sand | 6.4 mm | N/A | N/A | N/A | 0.6 |
| 100% EICP | 0.8 mm | 4.8 mm | crushed | N/A | 6.4 |
| 80% EICP, 20% t-AA | 0 | 0 | 2.0 mm | 4.2 mm | 226 |
| 60% EICP, 40% t-AA | 0 | 0 | 0 | 0 | >245 |
| 40% EICP, 60% t-AA | 0 | 0 | 0 | 0 | >245 |
| 20% EICP, 80% t-AA | 0 | 0 | 0 | 0 | >245 |
| 100% t-AA | 0 | 0 | 0 | 0 | >245 |

Note that observations pertaining to "Relative Hardness" are intended to provide a general sense of the test outcome that may not necessarily be an indication of mechanical strength. Asterisk indicates that several spots were tested before carbonate was detected.

The soilless glass beakers appeared to still be wet after the seven day experiment period. Therefore, the beakers were allowed to dry uncovered for an additional 18 days. However, the residue in the guar gum and xanthan gum EICP beakers still appeared to be wet even after 18 days of additional drying, so these specimens were dried in an oven for 24 hours at ≈90° C. before further testing. The non-hydrogel EICP solution in beaker #7 was dry within seven days. The polyol-cellulose mixtures were dry in by the seventh day in the glass beakers and in all of the soil cups by the second day. Color changes were not seen in the cups containing soil, possibly because the soil had a natural white to grayish appearance. All of the glass beakers that contained hydrogel-EICP solutions contained a white precipitate. Some of the white precipitate was partially suspended within the hydrogel for the guar gum and xanthan gum specimens, while the rest of the precipitate fell to (or formed at) the bottom of the hydrogel. The white precipitate appeared to be entirely at the bottom of the beakers in both polyol-cellulose-EICP specimens.

Figure 6A:
FIGS. 6A-6D show images of sand samples treated with a surficially-applied PAA EICP solution with a "window"
Figure 6B:
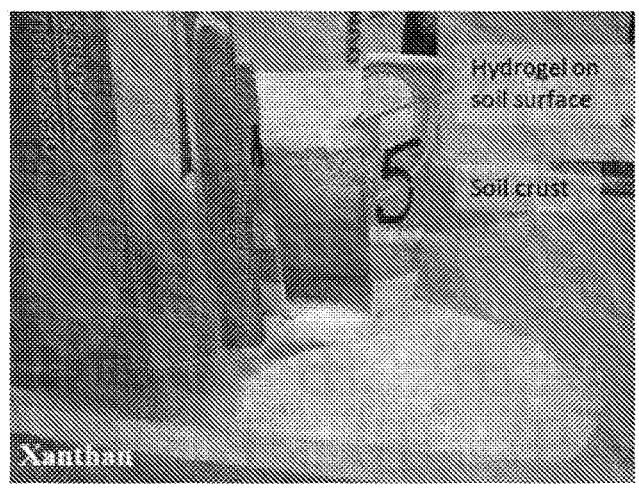
Figure 6C:
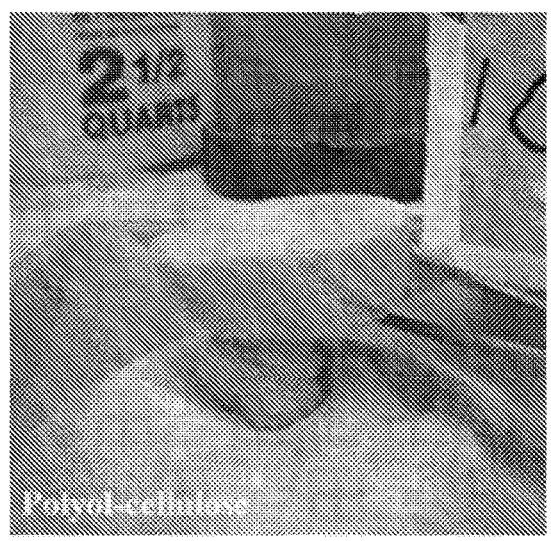
Figure 6D:

After seven days, a vertical "window" approximately 20-mm wide and 55-mm high was cut out of the paper cups and peeled open as shown in FIGS. 6A-6D, where FIG. 6A shows the guar gum sample, FIG. 6B shows the xantham gum sample, FIG. 6C shows a polyol-cellulose sample, and FIG. 6D shows a xanthan control sample. The cups were then tilted and tapped to allow loose soil to pour out, leaving behind a hard surficial soil crust in some cups. The thickness of the soil crust (if present) was measured and then observations were made regarding its durability by using metal tweezers to score the remaining soil exposed by the vertical window. The soil that remained in the cups was either (a) bound to well-defined surficial crusts, (b) weakly cemented in thicker layers penetrated by the EICP solution (rather than a surficial crust), or (c) held together by some other mechanism, believed likely to be residual unreacted $CaCl_2$) salt (controls). A soil crust was considered well-defined if the soil unit could remain intact after being lightly scored 3-4 times using a metal tweezer. The terms "well-defined" and "intact" are used herein to describe the hydrogel's ability to retain the EICP solution to form a surficial crust (of any perceived strength), and not necessarily an indication of mechanical strength. After the physical observations were completed, the soils were tripled rinsed in 18.2 MΩ DI water and allowed to dry for approximately 18 days before further testing.

Limited chemical and physical analyses were performed on the residue in the soilless glass beakers and on the crusts from the soil filled cups. The analyses were chosen in order to chemically and visually confirm the presence of $CaCO_3$, and to observe evidence of the mode of soil improvement (e.g. inter-particle cementation). Acidification using 1.0 M HCl acid for carbonate mineral detection was performed on all hydrogel-assisted EICP soilless beakers residues and soil crusts. The presence of $NH_3$ was qualitatively monitored based upon the odor of $NH_3$ over individual paper cups and glass beakers. Color changes and the appearance of moisture on the soil surface due to the hydrogel-EICP solution (and color changes in the beakers) were also monitored. Observations were made every 30 minutes during the first 3 hours of the experiment, and then daily thereafter. SEM imaging was used to visually confirm the presence of $CaCO_3$ on a few selected specimens of the soil crusts and to provide evidence of the mode of soil improvement.

Vapor pressure is the pressure exerted by a vapor that is in equilibrium with its liquid phase at a given temperature in a closed system. In general, a liquid with a lower vapor pressure has a lower tendency to evaporate. The addition of a solute may influence the vapor pressure of a liquid through enthalpic (intermolecular interactions) and/or entropic (mixing) effects. While the entropic effect is identical for all solutes, the enthalpic effect depends on specific molecular interactions and may vary greatly between solutes. Solutes that form strong associations with a solvent significantly decrease a solvent's (water in this case) vapor pressure, indicating greater water retention ability. The enthalpic effect of a solute on a solvent can be determined through vapor pressure measurements. The water vapor pressures of xanthan gum, guar gum, and polyol-cellulose hydrogel solutions were measured by a monometer (Fisher Scientific™ Traceable™ manometer). Each sample solution was prepared by directly dissolving the desired polymer in 18.2 MΩ deionized water (DI water). The polymer concentrations tested in this work were: 0.1, 0.2, 0.5, 1 and 2 wt % for guar gum; 0.1, 0.2, 0.5, 1, 2 and 5 wt % for xanthan; 5, 10, 20 and 30 wt % for polyol-cellulose hydrogel. The saturated vapor pressure of DI water was also measured. For each measurement, 100-mL liquid was poured into a clean air-dried 250-mL Erlenmeyer flask which was immediately plugged with a rubber stopper fixed to a glass tube and then quickly connected to a manometer via rubber tubing. Each measurement lasted at least 10 minutes to allow the system to reach equilibrium.

Referring to Table 4, the presence of carbonate was detected by acidification in the glass beaker precipitates and soil crusts of all specimens that received enzyme solution, indicating that hydrogel-assisted EICP does not prevent carbonate precipitation. However, Cups #1 and #2 that used guar gum and Cups #7, #8, and #10 that used polyol-cellulose hydrogel had to be tested in several locations before carbonate was detected (this is indicated by an asterisk in Table 4). Carbonate was not detected in any of the control specimens. Tiny bubbles (possibly $NH_3$ and $CO_2$) developed in the glass beakers and cups that received guar gum and xanthan gum assisted EICP solutions; the amount of bubbles that developed appeared to be independent of enzyme activity. No gas bubbles were seen in any of the soil filled cups that received polyol-cellulose-EICP solution, nor were any bubbles seen in any of the control specimens. The odor of $NH_3$ was detected in all cups and beakers that received enzyme and was not detected in any of the no enzyme controls. By the second day of the experiments, the gas bubbles that developed during the first three hours became smaller and appeared to increase slightly in number in the xanthan gum EICP solutions for the soil cups and soilless beakers. The amount of gas bubbles in the guar gum EICP solutions decreased by the second day, and was completely absent by the third day as the guar gum EICP solutions advanced into the soil. In the soilless beakers that received guar gum EICP solutions, the amount of gas bubbles appeared to decrease over several days, but was still visible by the third day. The odor of $NH_3$ was strong on day two of the experiment in all of the guar gum and xanthan gum EICP specimens, but was only faintly detectable by the third to fourth days of the experiment and without any specific pattern between the specimens. The odor of $NH_3$ was faintly detectable on day two of the experiment with the polyol-cellulose-EICP specimens and was undetectable by day three.

During the first three hours of the experiment, a visible but unmeasured amount of guar gum EICP and xanthan gum EICP solutions remained on the soil surface of all of the paper cups treated with these hydrogel-assisted solutions. Guar gum and xanthan gum solutions that did not receive enzyme were also visible on the soil surface of the control cups. The polyol-cellulose hydrogel solutions (both enzyme and control) infiltrated the soil within approximately 1 minute after application. All of the xanthan mixtures applied to sand appeared glossy until the third day of the experiment and the guar gum mixtures were glossy until the second day of the experiment. The lack of a glossy or wet appearance in the cups that received hydrogel was taken to mean the soil surface was essentially dry (desiccated, or dehydrated).

The following principal observations were made regarding the soil crusts: (1) soil crusts of varying thicknesses (2 to 12 mm) were formed in all cups where enzyme solution was added (these crusts were later confirmed to contain $CaCO_3$); (2) the soil crusts formed with xanthan gum and guar gum were generally thinner and well-defined, while the soil crusts formed using polyol-cellulose were highly variable; (3) the soil crusts were thicker and harder than crusts that formed in previous surficial soil stabilization tests conducted without hydrogel. These principle observations indicate that at least some the physical properties observed in the soil crusts appear to be independent of enzyme activity (high vs. low activity).

The depth of EICP solution penetration in the soil cups was determined by the fraction of loose sand that fell out of the viewing window after shaking and tapping. Sand that was penetrated with EICP solution or the urea and salt only solution did not fall out of the cup. For example, the sand in the "Xanthan Control" cup shown in FIG. 6 did not fall out of the cup even after being scored with a metal tweezer, while the soil below the soil crust in the "Xanthan" cup (hydrogel-EICP) fell out as loose sand. Table 4. Summary of the EICP solution penetration depth, crust thickness, and the perceived hardness of the crusts, and Table 5. Penetration depth of soil samples in fall cone test treated with EICP/t-AA mixture. The following principal observations were made regarding the effectiveness of the hydrogels at limiting penetration of the EICP solution into the cups filled with 40 mm of soil: (1) xanthan gum limited solution penetration to approximately 18 mm on average; (2) guar gum limited penetration to approximately 15 mm on average; and (3) polyol-cellulose hydrogel limited penetration to approximately 33 mm on average. The summary of solution penetration depth, crust thickness, and the perceived hardness of the crusts formed shows that crusts with a perceived hardness of "soft" were flexible, indicating that the hydrogel may be the primary agent holding sand particles together. The "hard" crusts were brittle and the "medium" crusts had some initial flexibility before a brittle break. In general, less penetration of the hydrogel-EICP solution resulted in harder, thinner crusts. These principle observations indicate that the effectiveness of the hydrogels at limiting penetration of the EICP solution into the cups filled with 40 mm of soil appears to be independent of enzyme activity.

Figure 7A:
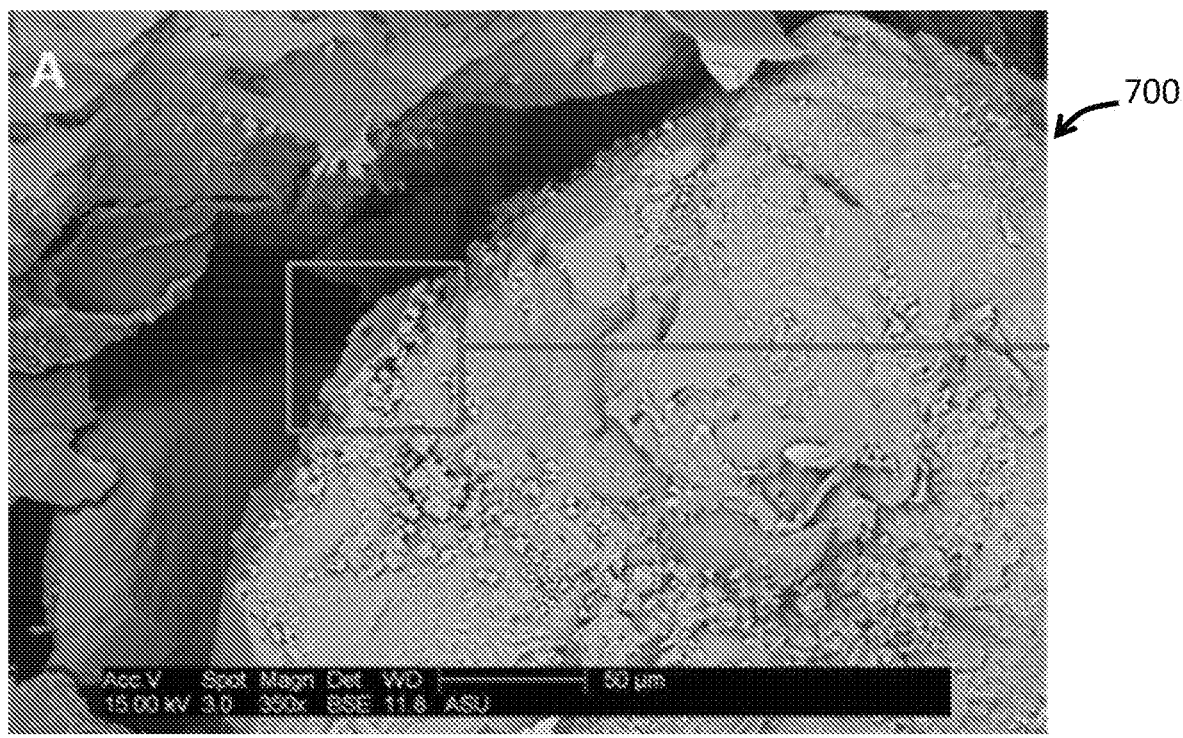
Figure 7B:
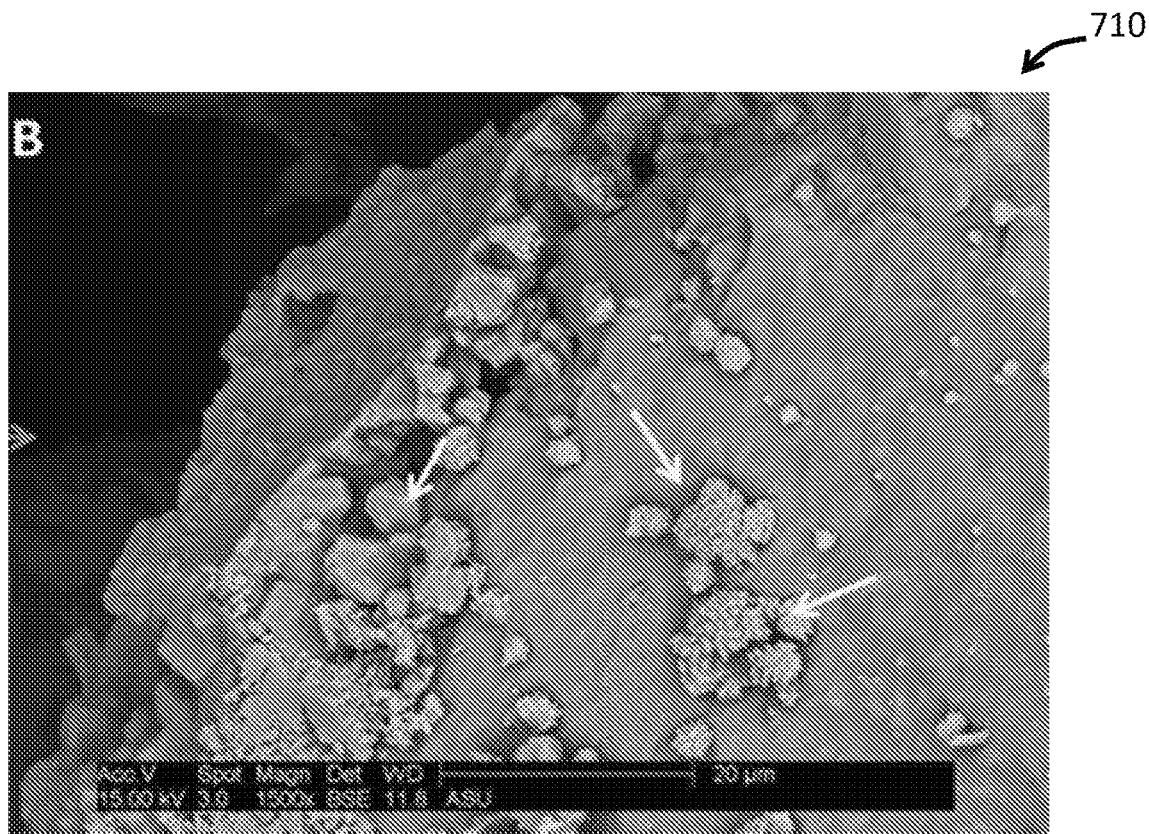
Figure 7C:
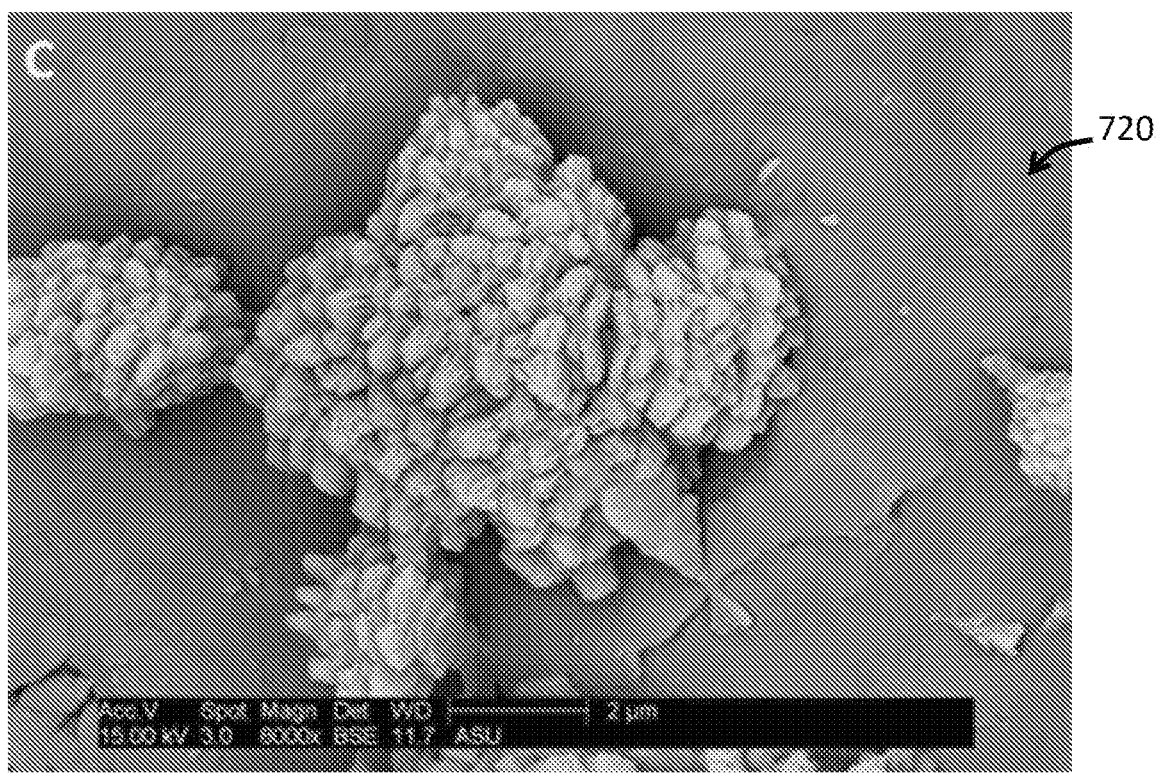
Figure 7D:
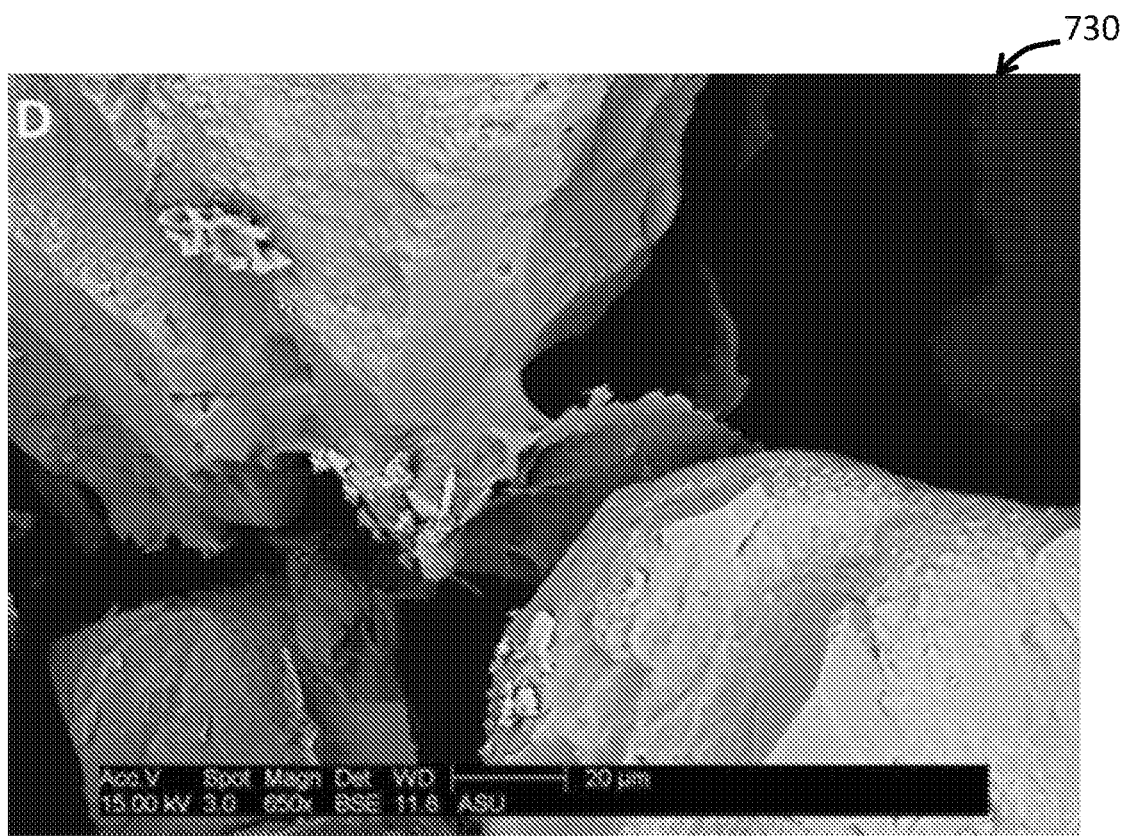

FIGS. 7A-7D illustrate SEM images of the soil crust obtained from Cup #4 using xanthan gum assisted EICP at high CaCl$_2$) concentration in accordance with some embodiments of the invention. The illustrated arrows indicate CaCO$_3$. The images 700, 710, 720 of FIG. 7A-C show inter-particle CaCO$_3$ detachment, and image 720 of FIG. 7C shows a CaCO$_3$ mass growing on a sand particle and image 730 of FIG. 7D shows hydrogel detachment from a sand particle. In addition to the initial rinsing previously described, the soil crust shown was aggressively rinsed to help reduce charging during SEM analysis. However, rinsing did not remove the residual materials entirely as seen in image 730 of FIG. 7D, where a thin connective film (presumed to be a hydrogel polymer) detached from one sand particle while still attached to another can be seen. Further, images of FIG. 7A through FIG. 7C clearly show the presence of CaCO$_3$ bound to the surface of the soil particles. A broken inter-particle soil contact is evident in images 700 of FIG. 7A and image 730 of FIG. 7D as a concave CaCO$_3$ detachment point, highlighting the mode of attachment between the silica sand soil particles in the crust.

FIGS. 8A-8C illustrates plots of the normalized vapor pressures (p/p°) of solutions containing the previously mentioned hydrogels (guar gum in FIG. 8A, xanthan gum in FIG. 8B, and polyol-cellulose in FIG. 8C) in accordance with some embodiments of the invention. Further, p is the water vapor pressure of the solution and p° is the saturated vapor pressure of pure water (i.e., the zero "Polymer wt %"). The vapor pressures of the guar gum and xanthan gum solutions are shown in plots 800 and 810 of FIG. 8A-8B (respectively). The decline in vapor pressures for the guar gum and xanthan gum solutions with increasing polymer content followed very similar trends with maximum declines of approximately 17% at 2% (w/w) guar gum and a 47% decline at 5% (w/w) xanthan (compared to pure water). The decline in water vapor pressure at relatively low hydrogel concentrations illustrates the strong water retention ability of both guar gum and xanthan gum, a phenomenon observed at very low hydrogel concentrations, i.e. 1.0% (w/w), as illustrated by plot 820 of FIG. 8C. However, the xanthan gum solutions showed slightly lower vapor pressures than the guar gum solutions at similar polymer concentrations. The polyol-cellulose solutions showed very little change in vapor pressure with increasing concentration, with a maximum decrease of ≈4% at the highest polyol-cellulose concentration (30% w/w).

In reference to the Flory-Huggins theory discussed earlier, the value of $\chi_{i-j}$ can be extracted by plotting the left side of equation (2) against $\Phi_p^2$, as shown in FIGS. 9A-9C. It is apparent plot 900 of FIG. 9A and plot 910 of FIG. 9B that the $\chi_{i-j}$ values for both systems are negative, indicating a negative enthalpy change during mixing. In other words, the interaction between water molecules and guar gum/xanthan gum polymer is stronger than the intermolecular forces of each pure component, which is likely due to the hydroxyl rich structure of both hydrogels. The bonds formed between the hydrogel hydroxyl groups and water molecules can hold water tightly to the hydrogel polymer chain and prevent significant evaporation. As a comparison, the $\chi_{i-j}$ value of polyol-cellulose hydrogel was close to zero, indicating no or weak binary interactions (FIG. 9C plot 920). These weak interactions lead to poor water retention and help explain why polyol-cellulose-EICP solution dried sooner than the xanthan gum or guar gum solutions.

In some embodiments of the invention, one or more clay minerals can optionally be used as a thickener. In some embodiments, any of the hydrogel or hydrogel precursor mixtures and/or compositions described herein can include at least one clay mineral additive to modify the viscosity and/or the shear modulus of the hydrogel and/or hydrogel precursor mixtures and/or compositions. For example, some embodiments include compositions comprising sodium montmorillonite and/or other clay minerals that can increase the viscosity and/or shear modulus of the hydrogel or hydrogel precursor mixtures and/or compositions.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:
1. A soil stabilization method comprising;
   forming an admixture of at least one hydrogel precursor and urease enzyme;
   contacting at least a portion of the admixture with soil; and
   forming a hydrogel network in-situ within at least a portion of the soil, wherein at least a portion of the hydrogel network includes in-situ precipitated calcium carbonate.

2. The method of claim 1, wherein the at least one hydrogel precursor comprises at least one hydrogel monomer or pre-polymer.

3. The method of claim 1, wherein the at least one hydrogel precursor comprises a hydrogel polymer.

4. The method of claim 1, wherein the contacting occurs by injecting or pumping the admixture into the soil.

5. The method of claim 1, wherein the contacting occurs by soaking the admixture into the soil.

6. The method of claim 1, wherein the contacting occurs by mixing the soil and the admixture.

7. The method of claim 1, wherein the soil includes at least one of a soil surface and a bulk soil.

8. The method of claim 1, wherein the urease enzyme is added to the admixture prior to contacting the admixture with the soil.

9. The method of claim 1, wherein at least a portion of the urease enzyme is present in the soil.

10. The method of claim 1, wherein at least a portion of the calcium carbonate precipitate is derived from at least one calcium salt added to the admixture prior to contacting the admixture with the soil.

11. The method of claim 1, wherein at least a portion of the calcium carbonate precipitate is derived from at least one divalent metal salt present in the soil.

12. The method of claim 1, wherein at least a portion of the carbonate precipitate is dispersed through at least a portion of the hydrogel network.

13. The method of claim 1, wherein the at least a portion of the hydrogel network is formed in-situ by polymerizing the at least one hydrogel precursor in the presence of the urease enzyme.

14. The method of claim 1, wherein the at least one hydrogel precursor is acrylic acid.

15. The method of claim 1, wherein the at least one hydrogel precursor is selected from polyvinylpyrrolidone, polyvinyl alcohol, polyurethane, sodium polyacrylate and acrylate polymers and copolymers, dextran, and hyaluronan.

16. The method of claim 1, wherein the at least one hydrogel precursor is selected from xanthan gum, guar gum, acacia tragacanth, chitosan, pectin, align, agar-agar, carrageenan, cassia gum, carboxymethyl cellulose, gellan gum, hydroxypropyl cellulose, Konjac gum, locust bean gum, plant-derived methylcellulose and hydroxypropyl methylcellulose, and microcrystalline cellulose.

17. The method of claim 1, wherein the hydrogel network comprises a polyacrylic acid gel.

18. The method of claim 10, wherein the calcium salt is calcium chloride.

19. The method of claim 10, wherein the admixture includes urea.

20. The method of claim 1, wherein the hydrogel network forms a root-like structure within the soil.

* * * * *